United States Patent
Serres et al.

(10) Patent No.: US 10,693,643 B2
(45) Date of Patent: Jun. 23, 2020

(54) METHODS AND SYSTEMS FOR DISTRIBUTED CRYPTOGRAPHICALLY SECURED DATA VALIDATION

(71) Applicant: PITT OHIO, Pittsburgh, PA (US)

(72) Inventors: Tom Serres, San Francisco, CA (US); Bettina Warburg, San Francisco, CA (US); Chuck Hammel, IV, Gibsonia, PA (US)

(*) Notice: Subject to any disclaimer, the term of this patent is extended or adjusted under 35 U.S.C. 154(b) by 0 days.

(21) Appl. No.: 16/428,886

(22) Filed: May 31, 2019

(65) Prior Publication Data

US 2020/0153635 A1    May 14, 2020

Related U.S. Application Data

(60) Provisional application No. 62/756,870, filed on Nov. 7, 2018.

(51) Int. Cl.
  *H04L 9/32* (2006.01)
  *H04L 29/12* (2006.01)

(52) U.S. Cl.
  CPC .......... *H04L 9/32* (2013.01); *H04L 29/12518* (2013.01)

(58) Field of Classification Search
  CPC . H04L 9/3268; H04L 2209/38; G06F 16/137; H04M 2215/0156
  See application file for complete search history.

(56) References Cited

U.S. PATENT DOCUMENTS

| 8,161,012 B1* | 4/2012 | Gerraty | G06F 21/53 707/687 |
| 9,641,338 B2 | 5/2017 | Sriram et al. | |
| 10,002,277 B1* | 6/2018 | Endress | G09C 1/00 |

(Continued)

FOREIGN PATENT DOCUMENTS

| WO | 2017143435 | 8/2017 |
| WO | 2018099920 | 6/2018 |

OTHER PUBLICATIONS

Naerland et al.; Dec. 2017; Blockchain to Rule the Waves—Nascent Design Principles for Reducing Risk and Uncertainty in Decentralized Environments.

(Continued)

*Primary Examiner* — Michael R Vaughan
(74) *Attorney, Agent, or Firm* — Caldwell Intellectual Property Law

(57) ABSTRACT

Methods and systems for cryptographically secured data validation. The system includes a first validator. The first validator is designed and configured to receive a first instance of an immutable sequential data structure containing at least a first digitally signed textual element containing at least a first physical asset transfer field populated with a at least a first physical asset transfer datum and at least a second digitally signed textual element generated by a second validator. The first validator authenticates the first instance of the immutable sequential data structure. The first validator generates at least a second validity indicating a determination by the first validator as to the accuracy of the at least a first physical asset transfer field. The first validator detects a conflict between the at least a first validity flag and the at least a second validity flag. The first validator transmits to the at least a second validator an indication of the conflict.

20 Claims, 12 Drawing Sheets

(56) References Cited

U.S. PATENT DOCUMENTS

| | | |
|---|---|---|
| 2015/0332283 A1 | 11/2015 | Witchey |
| 2016/0164884 A1 | 5/2016 | Sriram et al. |
| 2017/0046693 A1 | 2/2017 | Haldenby et al. |
| 2017/0243193 A1 | 8/2017 | Manian et al. |
| 2017/0317834 A1 | 11/2017 | Smith et al. |
| 2017/0331896 A1 | 11/2017 | Holloway et al. |
| 2018/0097637 A1* | 4/2018 | Weinfield .............. H04L 9/3263 |
| 2018/0130050 A1* | 5/2018 | Taylor ................ G06Q 20/3674 |
| 2018/0144298 A1 | 5/2018 | Rankin |
| 2018/0165612 A1 | 6/2018 | Saxena et al. |
| 2018/0167198 A1 | 6/2018 | Muller et al. |
| 2018/0174097 A1 | 6/2018 | Liu |
| 2018/0300693 A1* | 10/2018 | Gopinath ............. G06Q 20/065 |
| 2019/0280856 A1* | 9/2019 | Cheong ................ H04L 9/3239 |

OTHER PUBLICATIONS

Supply chain shipment tracking using ethereum blockchain based smart contracts; http://www.gazelle.in/BCSCM.pdf; Jun. 19, 2018.

Mearian, Lucas; Maersk, IBM create world's first blockchainbased,electronic shipping platform; https://www.computerworld.com/article/3247758/emerging-technology/maersk-ibm-create-worldsfirst-; Jun. 16, 2018.

Abeyratne et al.; Blockchain ready manufacturing supply chain using distributed ledger; https://www.researchgate.net/publication/308163874_Blockchain_Ready_Manufacturing_Supply_Chain_Using_Distributed_Ledger; Sep. 2016.

Chang et al.; A Blockchain-Based Traceable Certification System; https://link.springer.com/chapter/10.1007%2F978-3-319-76451-1_34; Mar. 29, 2018.

* cited by examiner

FIG. 8F

METHODS AND SYSTEMS FOR DISTRIBUTED CRYPTOGRAPHICALLY SECURED DATA VALIDATION

CROSS-REFERENCE TO RELATED APPLICATIONS

This application claims priority to Provisional Application No. 62/756,870 filed on Nov. 7, 2018 and entitled "SYSTEMS AND METHODS FOR DISTRIBUTED, CRYPTOGRAPHICALLY SECURED SHIPMENT DATA VALIDATION" the entirety of which is incorporated herein by reference.

FIELD OF THE INVENTION

The present invention generally relates to the field of computer security and cryptography. In particular, the present invention is directed to methods and systems for distributed cryptographically secured data validation.

BACKGROUND

Physical asset transfers have become an increasingly complex process involving coordination among multiple parties dispersed among multiple locations. As a result, multiple discrepancies can arise, such as billing discrepancies between carriers as well as data inconsistencies among parties. As a result, this can lead to reduced productivity and increased time to complete a transaction.

SUMMARY OF THE DISCLOSURE

In one aspect, a method of distributed, cryptographically secured data validation includes receiving, at a first validator, a first instance of an immutable sequential data structure. The first instance of the immutable sequential data structure includes at least a first digitally signed textual element containing at least a first physical asset transfer field populated with a at least a first physical asset transfer datum of a physical asset transfer and at least a second digitally signed textual element generated by at least a second validator, the at least a second digitally signed textual element containing a reference to the at least a first digitally signed textual element and at least a validity flag indicating a determination by the at least a second validator of the validity of the at least a first physical asset transfer field. The method includes authenticating, at the first validator, the first instance of the immutable sequential data structure. The method includes generating, at the first validator, at least a second validity flag indicating a determination by the first validator of the validity of the at least a first physical asset transfer field. The method includes detecting, at the first validator, a conflict between the at least a first validity flag and the at least a second validity flag. The method includes transmitting, to the at least a second validator, an indication of the conflict.

In another aspect, a system for distributed, cryptographically secured data validation includes a first validator. The first validator is designed and configured to receive a first instance of an immutable sequential data structure. The first instance of the immutable sequential data structure includes at least a first digitally signed textual element containing at least a first physical asset transfer field populated with a at least a first physical asset transfer datum of a physical asset transfer and at least a second digitally signed textual element generated by at least a second validator, the at least a second digitally signed textual element containing a reference to the at least a first digitally signed textual element and at least a validity flag indicating a determination by the at least a second validator of the validity of the at least a first physical asset transfer field. The first validator is designed and configured to authenticate the first instance of the immutable sequential data structure. The first validator is designed and configured to generate at least a second validity flag indicating a determination by the first validator of the validity of the at least a first physical asset transfer field. The first validator is designed and configured to detect a conflict between the at least a first validity flag and the at least a second validity flag. The first validator is designed and configured to transmit, to the at least a second validator, an indication of the conflict These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIGS. 8A-F are screenshots illustrating exemplary embodiments of a graphical user interface for performing distributed cryptographically secured data validation.

Figure 1:
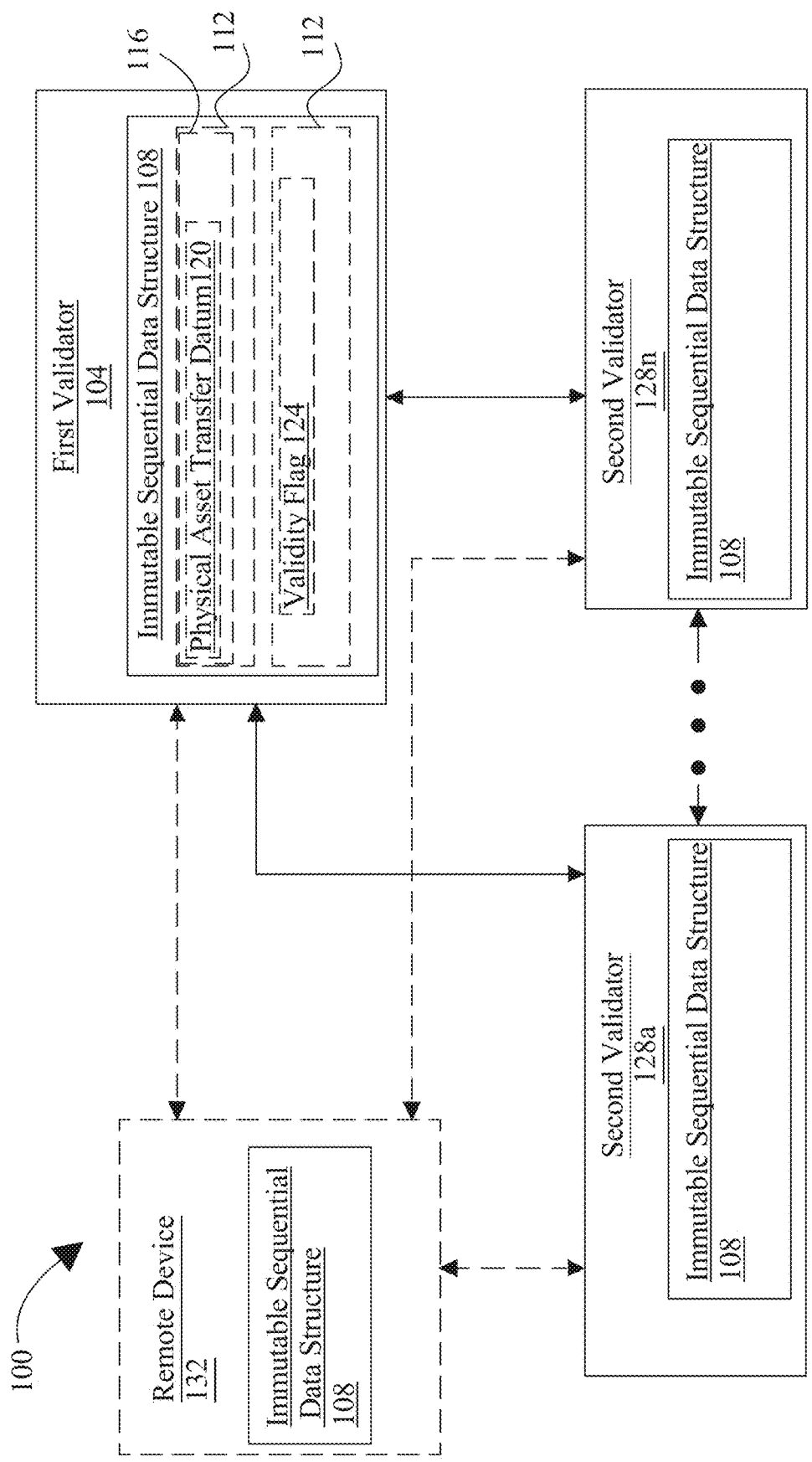
FIG. 1 is a block diagram illustrating an exemplary embodiment of a system for distributed cryptographically secured data validation.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for secure cryptographically secured data validation. In an embodiment, a physical asset transfer may be attested at various stages throughout the physical asset transfer to ensure accuracy and validity of information provided and generated. Attestations may be performed by various devices and/or users of devices. Attestations may reference different physical asset transfer data fields relating to different features of an agreement or contract governing a physical asset transfer. Attestations may be authenticated by other various devices and/or users of devices once information contained within physical asset transfer data fields has been confirmed. Attestations may be denied by various other devices and/or users of devices prompting generation of error flags. Error flags may prompt reconciliation and/or inquiry by other subsequent devices and/or users of devices. In an embodiment, error flags may halt movement of the physical asset transfer until errors are resolved. Such systems and methods provide numerous advantages by ensuring validity and accuracy of s physical asset transfer in real-time as it occurs. Further, in some embodiments error flags may halt movement of physical asset transfers until disputes are resolved so that chances of physical asset transfers arriving at incorrect destinations or with improper packaging are minimized. Transactions are posted to an immutable sequential data structure which assists in ensuring integrity of the system by distributing records of transactions across multiple devices.

In an embodiment, methods and systems described herein may implement one or more aspects of a cryptographic system. In one embodiment, a cryptographic system is a system that converts data from a first form, known as "plaintext," which is intelligible when viewed in its intended format, into a second form, known as "cyphertext," which is not intelligible when viewed in the same way. Cyphertext may be unintelligible in any format unless first converted back to plaintext. In one embodiment, a process of converting plaintext into cyphertext is known as "encryption." Encryption process may involve the use of a datum, known as an "encryption key," to alter plaintext. Cryptographic system may also convert cyphertext back into plaintext, which is a process known as "decryption." Decryption process may involve the use of a datum, known as a "decryption key," to return the cyphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the cyphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

Some embodiments of the disclosed systems and methods involve creation and/or evaluation of digital signatures. A digital signature as used herein is an encrypted mathematical representation of a file or other set of data using the private key of a public key cryptographic system. Signature may be verified by decrypting the encrypted mathematical representation using the corresponding public key and comparing the decrypted representation to a purported match that was not encrypted; if the signature protocol is well-designed and implemented correctly, this means the ability to create the digital signature is equivalent to possession of the private decryption key. Likewise, if mathematical representation of file is well-designed and implemented correctly, any alteration of the file will result in a mismatch with the digital signature; the mathematical representation may be produced using an alteration-sensitive, reliably reproducible algorithm, such as a hashing algorithm as described in further detail below. A mathematical representation to which the signature may be compared may be included with signature, for verification purposes; in other embodiments, the algorithm used to produce the mathematical representation is publicly available, permitting the easy reproduction of the mathematical representation corresponding to any file.

In some embodiments, persons, devices, or transactions may be authenticated or assigned a confidence level using digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

In some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature. Although digital signatures have been introduced here as performed using public key cryptographic systems, digital signatures may alternatively or additionally be performed using any non-interactive zero-knowledge proof; for instance, a proof may be recorded in conjunction with a datum, and a verification may be performed by any party seeking to evaluate the proof.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is lossy, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable sequential data structure as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1405-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Referring now to FIG. 1, an exemplary embodiment of a system 100 for distributed cryptographically secured data validation is illustrated. System 100 includes a first validator 104. First validator 104 may include any computing device as described or alluded to below in reference to FIG. 9. First validator 104 may include a plurality of computing devices as described below in reference to FIG. 9; plurality of computing devices may share computation or data storage tasks in any suitable way including parallel computing, sequential performance of specialized tasks, redundant or distributed computation or storage, or the like.

Figure 2:
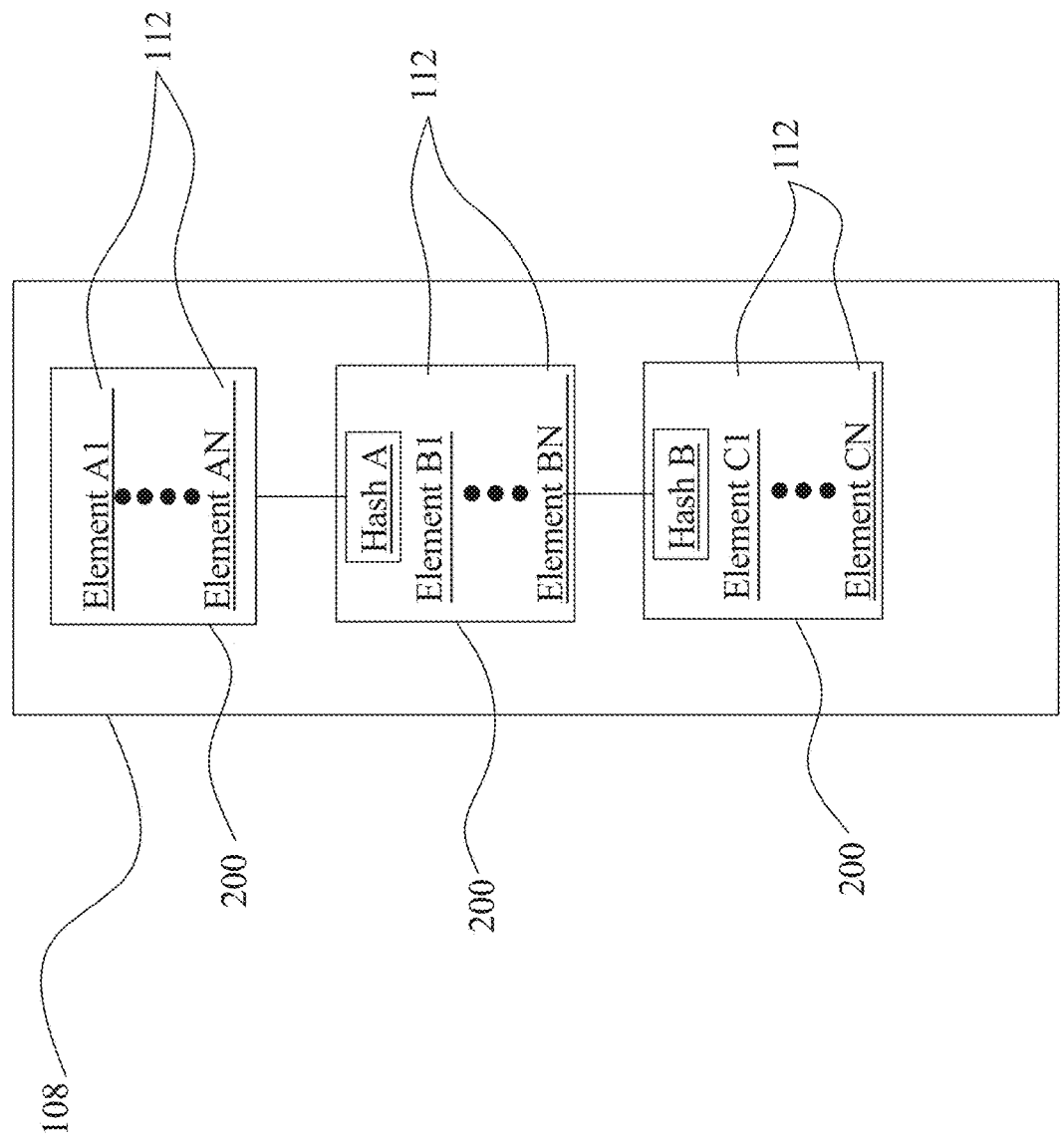
FIG. 2 is a block diagram illustrating an exemplary embodiment of an immutable sequential data structure.

First validator 104 may contain, in memory of first validator 104, an instance of an immutable sequential data structure 108. Instance of an immutable sequential data structure 108, as used herein, may be an entire copy of an immutable sequential data structure 108, one or more blocks or other portions of an immutable sequential data structure 108, and/or a link to a copy of an immutable sequential data structure 108. Instance of an immutable data structure 108 may include one or more digitally signed textual elements 112. Turning now to FIG. 2, an exemplary embodiment of an immutable sequential data structure 108 is illustrated. Immutable sequential data structure 108 may include any set of data used to record a series of digitally signed textual elements 112 in an inalterable format that permits authentication of such digitally signed textual elements 112. In some embodiments, immutable sequential data structure 108 records a series of digitally signed textual elements 112 in a way that preserves the order in which the digitally signed textual elements 112 took place. In one embodiment, a digitally signed textual element 112 is a collection of textual data; as a non-limiting example, textual data may include data stating that the owner of a certain transferable item represented in the digitally signed textual element 112 register is transferring that item to the owner of an address. A digitally signed textual element 112 may be signed by a digital signature created using the private key associated with the owner's public key, as described above. In a non-limiting example, digitally signed textual element 112 may describe a transfer of virtual currency, such as cryptocurrency as described below. Virtual currency may be a digital currency. The item of value may be a transfer of trust, for instance represented by a statement vouching for the identity or trustworthiness of the first entity. Digitally signed textual element 112 may describe the transfer of a physical good; for instance, digitally signed textual element 112 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with the digitally signed textual element 112 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

In one embodiment, an address is a textual datum identifying the recipient of virtual currency in a digitally signed textual element 112. In some embodiments, the address is linked to a public key, the corresponding private key of which is owned by the recipient of the digitally signed textual element 112. For instance, the address may be the public key. The address may be a representation, such as a hash, of the public key. The address may be linked to the public key in the memory of a computing device, for instance via a "wallet shortener" protocol. Where the address is linked to a public key, the transferee in the digitally signed textual element 112 may record a subsequent digitally signed textual element 112 transferring some or all of the value transferred in the first digitally signed textual element 112 to a new address in the same manner.

Immutable sequential data structure 108 may preserve an order in which the digitally signed textual elements 112 took place by listing them in chronological order. The ledger may preserve the order in which digitally signed textual elements 112 took place by listing them in blocks 200 and placing the blocks 200 in chronological order. The immutable sequential data structure 108 may be a distributed, consensus-based ledger, such as those operated according to the protocols promulgated by Ripple Labs, Inc., of San Francisco, Calif., or the Stellar Development Foundation, of San Francisco, Calif., or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add digitally signed textual elements 112 to the ledger but may not allow any users to alter digitally signed textual element 112 that have been added to the ledger. In some embodiments, the ledger is cryptographically secured; in one embodiment, a ledger is cryptographically secured where each link in the chain contains encrypted information that makes it practically infeasible to alter the ledger without betraying that alteration has taken place, for instance by requiring that an administrator or other party sign new additions to the chain with a digital signature. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 208 in a block chain computationally challenging; the incentive for producing sub-listings 208 may include the grant of new crypto-currency to the miners. Quantities of crypto-currency may be exchanged using at least a digitally signed assertion 200 as described above.

In some embodiments, immutable sequential data structure 108, once formed, cannot be altered by any party, no matter what access rights that party possesses. For instance, immutable sequential data structure 108 may include a hash chain, in which data is added during a successive hashing process to ensure non-repudiation. Immutable sequential data structure 108 may include a block chain. In one embodiment, block chain is an immutable sequential data structure 108 that records one or more new digitally signed textual elements 112 in a data item known as a block 208. An example of a block chain is the BITCOIN block 208-chain used to record BITCOIN digitally signed textual elements 112. Blocks 200 may be created in a way that places the blocks 200 in chronological order and links each block 208 to a previous block 208 in the chronological order, so that any computing device may traverse the blocks 200 in reverse chronological order to verify any digitally signed textual elements 112 listed in the block chain. Each new block 208 may be required to contain a cryptographic hash describing the previous block 208. In some embodiments, the block chain contains a single first block 208, known as a "genesis block."

Creation of a new block 208 may be computationally expensive; for instance, the creation of a new block 208 may be designed by a "proof of work" protocol accepted by all participants in forming the block chain to take a powerful set of computing devices a certain period of time to produce. Where one block 208 takes less time for a given set of computing devices to produce the block 208, the protocol may adjust the algorithm to produce the next block 208 so that it will require more steps; where one block 208 takes more time for a given set of computing devices to produce the block 208, protocol may adjust the algorithm to produce the next block 208 so that it will require fewer steps. As an example, the protocol may require a new block 208 to contain a cryptographic hash describing its contents; the cryptographic hash may be required to satisfy a mathematical condition, achieved by having the block 208 contain a number, called a nonce, whose value is determined after the fact by the discovery of the hash that satisfies the mathematical condition. Continuing the example, the protocol may be able to adjust the mathematical condition so that the discovery of the hash describing a block 208 and satisfying the mathematical condition requires more or less steps, depending on the outcome of the previous hashing attempt. The mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, the production of a new block 208 according to the protocol is known as "mining." The creation of a new block 208 may alternatively be designed by a "proof of stake" protocol as will be apparent to those skilled in the art upon reviewing the entirety of this disclosure.

In some embodiments, mining protocol also creates an incentive to mine new blocks 200. Incentive may be financial; for instance, successfully mining a new block 208 may result in the person or entity that mines the block 208 receiving a predetermined amount of currency. Currency may be fiat currency. Currency may be crypto-currency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of blocks 200. Each block 208 created in block chain may contain a record or digitally signed textual element 112 describing one or more addresses that receive an incentive, such as virtual currency, as the result of successfully mining the block 208.

Where two entities simultaneously create new blocks 200, immutable sequential data structure 108, such as without limitation block chain, may develop a fork; the protocol may determine which of the two alternate branches in the fork is the valid new portion of the block chain by evaluating, after a certain amount of time has passed, which branch is longer. "Length" may be measured according to the number of blocks 200 in the branch. Length may be measured according to the total computational cost of producing the branch. A fork resolution protocol may treat only digitally signed textual elements 112 contained the valid branch as valid digitally signed textual elements 112. When a branch is found invalid according to this protocol, digitally signed textual elements 112 registered in that branch may be recreated in a new block 208 in the valid branch; fork resolution protocol may reject "double spending" digitally signed textual elements 112 that transfer the same virtual currency that another digitally signed textual element 112 in the valid branch has already transferred. As a result, in some embodiments the creation of fraudulent digitally signed textual elements 112 requires the creation of a longer block chain branch by the entity attempting the fraudulent digitally signed textual element 112 than the branch being produced by the rest of the participants; as long as the entity creating the fraudulent digitally signed textual element 112 is likely the only one with the incentive to create the branch containing the fraudulent digitally signed textual element 112, the computational cost of the creation of that branch may be practically infeasible, guaranteeing the validity of all digitally signed textual elements 112 in the block chain.

Additional data linked to a digitally signed textual element 112 may be incorporated in blocks 200 in the block chain; for instance, data may be incorporated in one or more fields recognized by block chain protocols that permit a person or computer forming a digitally signed textual element 112 to insert additional data in the block chain. In some embodiments, additional data is incorporated in an unspendable digitally signed textual element 112 field. For instance, the data may be incorporated in an OP_RETURN within the BITCOIN block chain. In other embodiments, additional data is incorporated in one signature of a multi-signature digitally signed textual element 112. In an embodiment, a multi-signature digitally signed textual element 112 is a digitally signed textual element 112 to two or more addresses. In some embodiments, the two or more addresses are hashed together to form a single address, which is signed in the digital signature of the digitally signed textual element 112. In other embodiments, the two or more addresses are concatenated. In some embodiments, the two or more addresses may be combined by a more complicated process, such as the creation of a Merkle tree or the like. In some embodiments, one or more addresses incorporated in the multi-signature digitally signed textual element 112 are typical crypto-currency addresses, such as addresses linked to public keys as described above, while one or more additional addresses in the multi-signature digitally signed textual element 112 contain additional data related to the digitally signed textual element 112; for instance, the additional data may indicate the purpose of the digitally signed textual element 112, aside from an exchange of virtual currency, such as the item for which the virtual currency was exchanged. In some embodiments, additional information may include network statistics for a given node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the node 304 in FIG. 4) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

In some embodiments, and still referring to FIG. 2, one or more steps in forming, modifying, recording transactions in, and authenticating immutable sequential data structure 108 are performed by a network of nodes. Each node may be a computing device as described below in reference to FIG. 7, such as without limitation a validator such as first validator 104; network may be any network interconnecting computing devices as described below in reference to FIG. 9, including without limitation the Internet, a subset of the Internet, a virtual private network, private network, localized network, and/or an intranet. Each node may be designed and configured to participate in, or practice one or more processes described herein for creation, modification, and/or authentication of immutable sequential data structure 108, portions or blocks thereof, and/or transactions.

With continued reference to FIG. 2, in an embodiment, immutable sequential data structure 108 is copied in its entirety to each node. Alternatively or additionally, immutable sequential data structure 108 may be copied to some nodes but not to others; for instance, where the immutable sequential data structure 108 is a block chain or a consensus ledger created for exchanges of virtual currency or other commercial exchanges, the immutable sequential data structure 108 may be copied to all nodes participating in such exchanges. In other embodiments still, various components of the ledger are distributed to various computing devices, such as the nodes in a network. In other embodiments still, subcomponents of the complete ledger are distributed to various computing devices in a network, such that a group of computing devices such as the nodes may each have a copy of the same subcomponent, and in totality, all subcomponents making up the complete ledger are contained in the network. Where immutable sequential data structure 108 is centralized, computing devices that do not possess a copy of the immutable sequential data structure 108 may obtain information from and convey information to the immutable sequential data structure 108 by communicating with the computing device or set of computing devices on which the centralized immutable sequential data structure 108 is maintained. Where immutable sequential data structure 108 is decentralized and multiple copies of the entire immutable sequential data structure 108 are distributed to multiple computing devices, computing devices that do not possess a copy of the immutable sequential data structure 108 may obtain information from and convey information to a copy of the immutable sequential data structure 108 residing on a computing device that does have a copy; requests for information and changes to the immutable sequential data structure 108 may be propagated to all other computing devices having copies of the immutable sequential data structure 108.

Referring again to FIG. 1, immutable sequential data structure 108 may include at least a digitally signed textual element 112 including a physical asset transfer field 116. A physical asset transfer field 116 may include a location or entry where a physical asset transfer datum 120 may be recorded. A physical asset transfer datum 120 may include any datum describing information concerning a physical asset transfer. As used in this disclosure, a physical asset transfer is a process whereby a tangible item is moved from a first location to a second location; a physical asset transfer may include a transfer of property rights in the tangible item, which may be a temporary transfer in which, for instance, an owner of a the tangible item places the item into care and/or custody of a party that will carry the tangible item to the second location, or to an intermediate point, or may be a transfer whereby a receiving party may gain rights of ownership and/or use in the physically tangible item upon receipt. A physical asset transfer may be accomplished in multiple stages, which may correspond to movement of a tangible item by a series of entities, using a series of similar or different modes of movement such as movement via aircraft, ship, truck, train, or the like. Attributes of physical asset transfer may include any variation or element of information subject to use as a physical asset transfer datum 120. A physical asset transfer datum 120 may include information about physical asset transfer such as nature of the transfer, number of units to be transferred, labeling, country of origin, transfer times, transfer destination, number of checkpoints, customer, supplier, material information, transfer regulations, pricing, equipment necessary to transfer and receive materials being transferred, bill of lading, fees, transfer speed, carrier details, interchange details, invoicing details, physical asset transfer details, external parties; details, attestations between participating identities (carrier or carrier controlled) and the like.

Still referring to FIG. 1, physical asset transfer field 116 may be identified within a digitally signed textual element 112 using any suitable element of data, including a flag or label indicating that the digitally signed textual element 112 contains the physical asset transfer field 116; a digitally signed textual element 112 may contain only a single physical asset transfer field 116, such that a label indicating existence of a physical asset transfer field 116 may unambiguously indicate to a validator such as first validator 104 how to locate the physical asset transfer field 116. Alternatively or additionally, a physical asset transfer field 116 may be demarcated by elements indicating beginning and end points of the physical asset transfer field 116 and/or a portion thereof, which may include, without limitation extensible markup language (XML) tags and/or any other element having an agreed-upon significance according to a protocol used in system 100.

With continued reference to FIG. 1, immutable sequential data structure 108 may include at least a digitally signed textual element 112 including a validity flag 124. validity flag 124 as used herein includes any datum that is interpreted by system 100 as indicating whether first validator 104, or a user of first validator 104, agrees or disagrees with at least a first physical asset transfer datum 120. validity flag 124 may include an attestation. An attestation as used herein is any confirmation that a validator such as first validator 104, or a user of a validator, agrees to the accuracy of first physical asset transfer datum 120. For example, first physical asset transfer datum 120 may include information pertaining to a final destination of physical asset transfer. An attestation may be generated after a validator or user of the validator reviews a final destination of physical asset transfer contained within first physical asset transfer datum 120 and attests to the accuracy and validity of such information. physical asset transfer datum 120 In an embodiment, generating an attestation functions in system 100 as a final confirmation that validator such as first validator 104 or a user thereof generates with regard to a physical asset transfer datum 120. In an embodiment, entry of attestation may be equivalent to signing a contract confirming accuracy of a physical asset transfer datum 120. In an embodiment, attestation may be performed by user of a validator who may review a physical asset transfer datum 120 and click on "attest to details" in a graphical user interface or the like. By clicking on "attest to details" user may be agreeing to the validity and accuracy of a first physical asset transfer datum 120. In an embodiment, after a user of a validator has clicked on "attest to details" a pop-up window on the validator, or a display in communication with the validator, may appear where the user can review the at least a first physical asset transfer datum 120 that they are attesting to and confirm or cancel the attestation. Once an attestation is complete, a second digitally signed textual element 112 may be generated and proceed to be posted to an instance of the immutable sequential data structure as described in more detail below.

Still referring to FIG. 1, validity flag 124 may be an error flag. Error flag as used herein may include an indication that a validator or user of the validator does not agree to the accuracy of at least a physical asset transfer datum 120 such as first physical asset transfer datum 120. For example, an error flag may be generated when first physical asset transfer datum 120 was entered according to a first assumption early on in the physical asset transfer before all information is known or confirmed; for instance, first physical asset transfer datum 120 may include a price for a physical asset transfer over a particular leg of a physical asset transfer, with the assumption that the physical asset does not require special handling or packaging; whereas a user operating a validator may determine that the physical asset is fragile, requiring protective packaging, that the good is heavy, requiring a dolly or life gate, or the like. In an embodiment, a changed assumption may occasion an increase or decrease in asset transfer pricing, a modification to speed necessary to perform the physical asset transfer, or other changes to physical asset transfer. Thus, error flag may indicate that an agreement has not yet been reached regarding the terms described in a physical asset transfer datum 120 and that a reconciliation process between parties to the physical asset transfer transaction may be necessary. Reconciliation process may, as a non-limiting example, include communication between a first party and a second party, which may take place over any suitable communication channel as described in more detail above in FIG. 1. Communication channel may include for example and without limitation telephonic, electronic, or in-person communication. Reconciliation process may include a process in which an error flag may be accepted and/or rejected by at least a second validator. At least a second validator may accept an error flag from first validator when second validator does not agree to the accuracy of at least a physical asset transfer datum 120 and/or at least a physical asset transfer datum 120 may still be modifiable. For example, second validator may accept an error flag from a validator when at least a physical asset transfer datum 120 contains bad data fields. Bad data fields may include inaccurate data fields and/or data fields that are incomplete, blank, and/or do not contain the most up to date data. In an embodiment, upon accepting an error flag from a validator, second validator may cause status of physical asset transfer to be changed to "failed." A "failed" status of physical asset transfer may cause a validator and second validator to be unable to continue with physical asset transfer until bad data fields are fixed. A "failed" status may cause the physical asset transfer to fail, so that the physical asset is physically stopped from being transferred and quarantined until the "failed status" is resolved. In such an instance, a validator may fetch new data to fix the bad data fields contained within the at least a physical asset transfer datum 120. Fetching new data may include a new set of data related to the physical asset transfer to be brought in and cause the at least a physical asset transfer datum 120 to be updated. Once bad data fields have been fixed, physical asset transfer status may be changed to "attestation required." "Attestation required" status may enable physical asset transfer to proceed to be verified by a subsequent validator. At least a second validator may accept an error flag from first validator when at least a physical asset transfer datum 120 may still be modifiable. At least a physical asset transfer datum 120 may be modifiable when information contained within at least a physical asset transfer datum 120 is still mutable at this particular point in the physical asset transfer process. For example, mutable information may include a physical asset transfer whereby information pertaining to a first leg is confirmed, but information pertaining to a second leg is still in flux. Second leg may require selection of a new carrier because the first selected carrier may be unable to participate in the physical asset transfer. Mutable information may also include selection of weight of the physical asset, temperature conditions to be maintained throughout the physical asset transfer, and/or protective packing and/or caging necessary for a particular leg of the physical asset transfer. At least a physical asset transfer datum 120 may not be modifiable when information contained within at least a physical asset transfer datum 120 is immutable at this particular point in the physical asset transfer process as described in more detail below.

Figure 4:
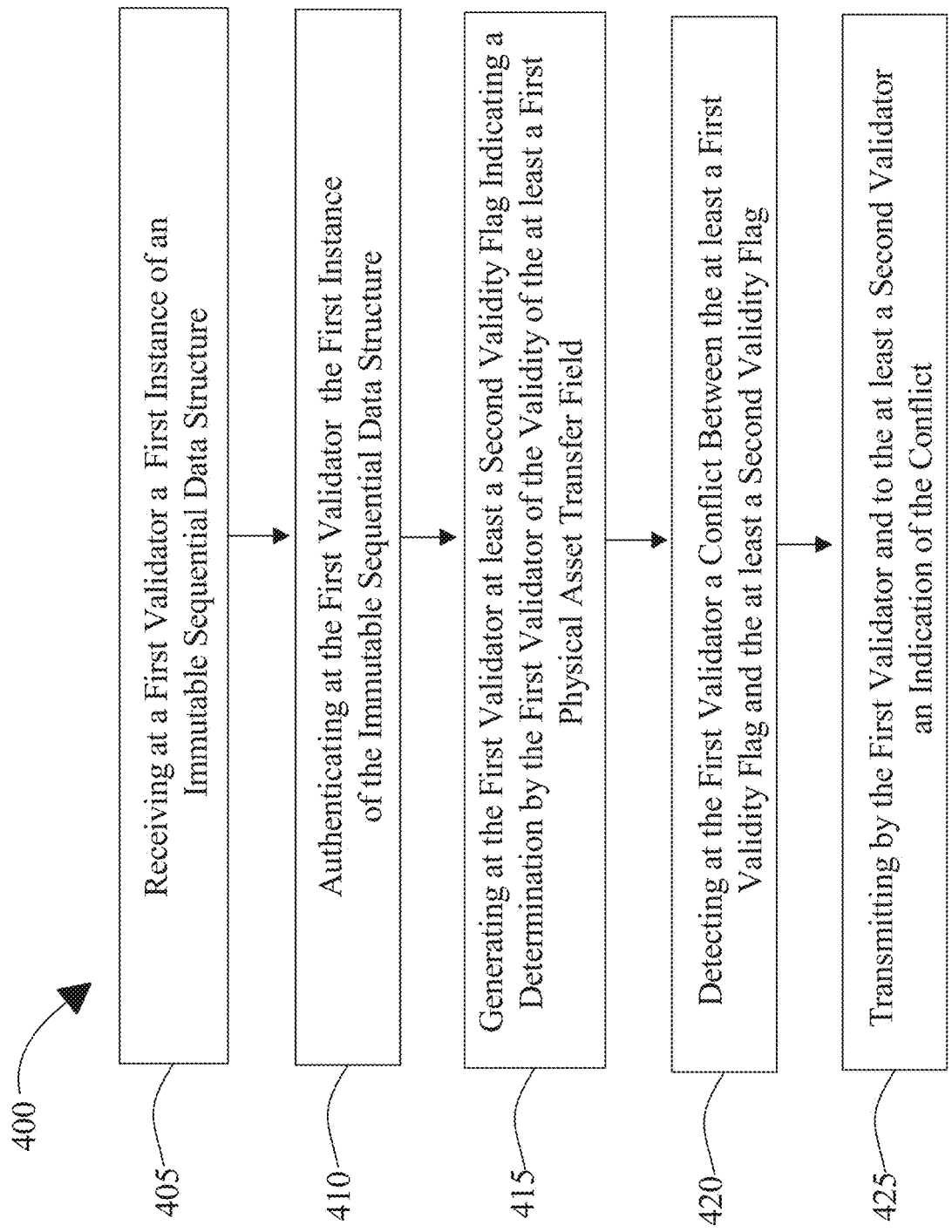
FIG. 4 is a flow diagram illustrating an exemplary method of distributed cryptographically secured data validation.

With continued reference to FIG. 4, reconciliation process may include a process in which an error flag may be rejected by at least a second validator. At least a second validator may reject an error flag when at least a second validator agrees to the accuracy of at least a physical asset transfer datum 120 and/or when at least a physical asset transfer datum 120 may not be modifiable. This may include for example information contained within at least a physical asset transfer datum 120 that is immutable. For example, a second validator may reject an error flag from a first validator 104 when first validator generated an error flag by accident and information contained within at least a physical asset transfer datum 120 is accurate. For example, first validator 104 may generate an error flag when first validator 104 determines, or a user of first validator 104 believes, that at least a physical asset transfer datum 120 contains bad data fields. Second validator may review data contained within bad data fields and find that at least a physical asset transfer datum 120 does not contain bad data fields and information contained is accurate. physical asset transfer datum 120 Second validator may then transmit a communication to first validator 104 indicating that second validator does not agree with the determination of first validator; this may trigger a reconciliation process whereby first validator and second validator determine validity of the error flag and/or physical asset transfer datum 120.

With continued reference to FIG. 1, reconciliation process may include a third party, such as a remote device and/or user of remote device who may act as an arbitrator of disagreements between parties such as disputes between validity flags 124 raised between first validator 104 and second validator. Remote device may arbitrate disagreements such as disputes pertaining to whether an insurer will cover costs or risks produced by a modification to at least a modified physical asset transfer datum 120 or failure to post such a modification, and/or to correct errors in physical asset transfer data. In such an instance, modified physical asset transfer datum 120 may produce a modified version of physical asset transfer datum 120 containing the modified data. In an embodiment, a an additional digitally signed textual element 112 including a second reference to the at least a first physical asset transfer field 116 and at least a second validity flag 124 may be received by the first validator 104 from a second validator. An additional digitally signed textual element 112 may include the at least a first physical asset transfer field 116 that has been examined by second validator. Third digitally signed textual element 112 including a second reference to the at least a first physical asset transfer field 116 may include any reference as described above. In an embodiment, second reference to the at least a first physical asset transfer field 116 may be the same as first reference to the at least a first physical asset transfer field 116. In yet another non-limiting example, second reference to the at least a first physical asset transfer field 116 may be different than first reference to the at least a first physical asset transfer field 116. In an embodiment, both first reference and second reference may uniquely identify the at least a first physical asset transfer field 116. Additional digitally signed textual element 112 includes at least a second validity flag 124. The at least a second validity flag 124 may include an attestation and/or an error flag. In an embodiment, second validity flag 124 that differs from first validity flag 124 may cause remote device to arbitrate dispute between the differing validity flags 124 as described in more detail above. In an embodiment, arbitrating dispute may include a consensus vote of the three verifiers and/or participants to determine how to proceed. In yet another embodiment, dispute may be arbitrated whereby remote device may act as tiebreaker and non-consensus vote is necessary. First validator 104 may post one or more additional digitally signed transactions with additional validity flags 124, which may in turn occasion one or more of the above-described steps to be repeated. Posting one or more additional digitally signed transactions with additional validity flags 124 may be performed by any of the methods as described below at step.

In an embodiment, and still referring to FIG. 1, a physical asset transfer may be associated with a list of validators able to post validity flags 124 as described above; list of validators may be included in one or more digitally signed textual entries as described above. As a non-limiting example, a validator and/or other computing device may create a first entry or set of entries concerning a particular physical asset transfer, where the first entry or set of entries contains one or more validators that are able to post validity flags 124, where "posting" a validity flag 124, as used herein, is a process of creating a digitally signed textual element 112; each of one or more validators may post an attestation indicating that they are members of the list and/or an error flag indicating that they are not members of the list. In the latter case, a reconciliation process may be performed to determine whether a validator that posted an error flag is on the list. Subsequently, a new validator may be added to the list; this may be performed, e.g., by a posting of a digitally signed textual element 112 by a computing device that created first entry or set of entries as described above, or by posting of a digitally signed textual entry identifying the new validator followed by posting of validity flags 124 by validators already on the list, where attestation by all validators on the list may indicate that new validator is now on the list, and an error flag by at least one validator may trigger reconciliation concerning the inclusion of the new validator.

Continuing to refer to FIG. 1, a physical asset transfer datum 120 may be modified, in an embodiment, by posting a second digitally signed textual element 112 containing a reference to a physical asset transfer data field containing the physical asset transfer datum 120 and a replacement physical asset transfer datum 120; this may, for instance, be performed by any validator upon completion of a reconciliation process and/or during any point of validation and/or reconciliation process. In an embodiment, if a physical asset transfer datum 120 as posted is referred to by attestations created by each validator currently on list of validators as described above, physical asset transfer datum 120 may become immutable; that is, further digitally signed textual elements 112 purporting to modify the physical asset transfer datum 120 will be rejected by validators in system 100.

With continued reference to FIG. 1, any digitally signed textual element 112 and/or physical asset transfer datum 120 may be posted in any suitable form, including in machine-readable forms; for instance, each datum and/or digitally signed transaction may be posted in an encoded form that may be stored and/or read efficiently by computing devices configured to perform steps of method 400 as described herein. In an embodiment, a graphical user interface (GUI) may be utilized to display one or more aspects of such data to a user. In an embodiment, GUI may function to translate machine-readable data into one or more fields, buttons, or the like into which users may enter commands indicating, as a non-limiting example, data contained within at least a physical asset transfer datum 120 and/or validity flags 124 including an attestation and/or an error flag. For example, GUI may show unattested physical asset transfer datum 120s with buttons that a user may activate to generate validity flags 124 and generate an attestation or error flag as described above. In yet another non-limiting example, GUI may show a transaction log which may reflect current status of transactions showing physical asset transfer status such as "attestation required" and/or "failed." In yet another example, GUI may show a status log that may provide status information which may include "pending," "inaccurate," and "accurate." Pending may reflect that no action has yet been taken by a validator in regard to attestation. Inaccurate may reflect that a party and/or validator has raised a flag against one or more of the fields. Accurate may reflect that a party and/or validator agrees to all data contained within the fields.

Still referring to FIG. 1, first validator 104 may be communicatively connected to at least a second validator 128a-n. At least a second validator 128a-n may include any computing device as described or alluded to below in reference to FIG. 9. Each validator of at least a second validator 128a-n may include a plurality of computing devices as described below in reference to FIG. 9; plurality of computing devices may share computation or data storage tasks in any suitable way including parallel computing, sequential performance of specialized tasks, redundant or distributed computation or storage, or the like.

With continued reference to FIG. 1, first validator may communicate to at least a second validator 128a-n through a communication network. Connection to communication network may include connection via a network interface card (e.g., a mobile network interface card, a LAN card), a modem, any other wired or wireless means usable for connection to a communication network, and/or any combination thereof. A communication network may include a wide area network (e.g., the Internet, an enterprise network), a local area network (e.g., a network associated with an office, a building, a campus or other relatively small geographic space), a telephone network, a data network associated with a telephone/voice provider (e.g., a mobile communication provider data and/or voice network), a direct connection between two computing devices, and any combination thereof. A communication network may employ a wired and/or wireless mode of communication. In general, any network topology may be used.

With continued reference to FIG. 1, system 100 may include a remote device 132. Remote device 132 may include any computing device as described or alluded to below in reference to FIG. 9. Remote device 132 may include a plurality of computing devices as described below in reference to FIG. 9; plurality of computing devices may share computation or data storage tasks in any suitable way including parallel computing, sequential performance of specialized tasks, redundant or distributed computation or storage, or the like. Remote device 132 may be operated by a third party such as for example a user of system 100. Remote device 132 may communicate with first validator 104, second validator 128a-n, and/or any other component of system 100 through a communication network. Communication network may include any of the networks as described above.

With continued reference to FIG. 1, first validator 104 may be designed and/or configured to perform any process and/or any step of any process disclosed, described, or alluded to in this disclosure, including without limitation method 400 as described in further detail below. As a non-limiting example, first validator 104 may be designed and configured to receive a first instance of an immutable sequential data structure, wherein the first instance of the immutable sequential data structure includes at least a first digitally signed textual element 112 containing at least a first physical asset transfer field populated with a first physical asset transfer datum of a physical asset transfer, at least a first digitally signed textual element 112 containing at least a first physical asset transfer field populated with a first physical asset transfer datum of a physical asset transfer, and at least a second digitally signed textual element 112 generated by at least a second validator, the at least a second digitally signed textual element 112 containing a reference to the first digitally signed textual element 112 and at least a validity flag indicating a determination by the at least a second validator of the validity of the at least a first physical asset transfer field, to authenticate the first instance of the immutable sequential data structure, to generate at least a second validity flag indicating a determination by the first validator of the validity of the at least a first physical asset transfer field, to detect a conflict between the at least a first validity flag and the at least a second validity flag, and to transmit, to the at least a second validator, an indication of the conflict, as described in further detail below.

Figure 3:
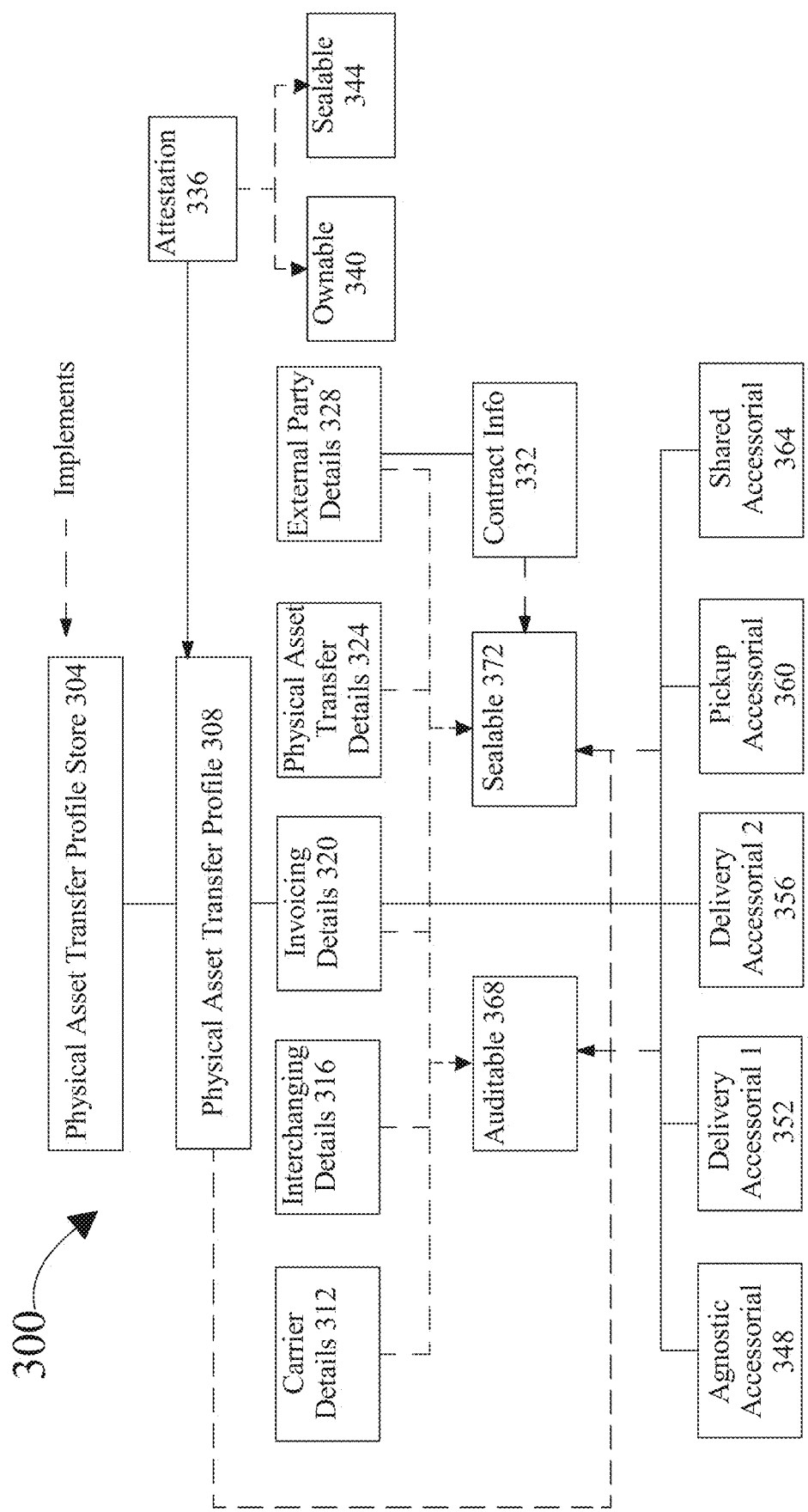
FIG. 3 is a process flow diagram illustrating exemplary embodiments of groupings of digitally signed textual elements relating to various aspects of physical asset transfer.

Referring now to FIG. 3, a process flow diagram of exemplary embodiments of groupings of digitally signed textual elements relating to various aspects of physical asset transfer are illustrated. Physical asset transfer profile store 304 may contain any suitable information and/or data relating to physical asset transfer that may be stored including any information that may be utilized during any of the processes that occur as described in any of the methods described in this disclosure. Physical asset transfer profile store 304 may be stored or substantiated as one or more digitally signed textual elements in immutable sequential data structure 108. Physical asset transfer profile 308 contains any and all suitable information relating a particular physical asset transfer. Carrier details 312 includes any and all suitable information relating to carrier. Carrier details 312 may be stored or substantiated as one or more digitally signed textual elements in immutable sequential data structure 108. Carrier details 312 may include for example details such as pickup carrier standard carrier alpha code (scac), delivery carrier scac, controlling carrier scac, delivery carrier pro number, and/or pickup carrier pro number. Interchanging details 316 includes any and all suitable information relating to interchange. Interchanging details 316 may be stored or substantiated as one or more digitally signed textual elements in immutable sequential data structure 108. Interchanging details 316 may include for example planned zip code for interchange, planned gateway code for interchange, actual zip code where the interchange took place, actual gateway code where the interchange took place, and/or interchange manifest of pickup carrier and driver company.

Still referring to FIG. 3, invoicing details 320 may include any and all suitable information relating to invoicing. Invoicing details 320 may be stored or substantiated as one or more digitally signed textual elements in immutable sequential data structure 108. Invoicing details 320 may include for example, accessorial charges, pickup revenue split, delivery carrier revenue split, total revenue, billing terms, whether the physical asset was successfully delivered or not, whether the signature is received or not and other accessorial details. Physical asset transfer details 324 may include any and all suitable information relating to physical asset transfer. Physical asset transfer details 324 may be stored or substantiated as one or more digitally signed textual elements in immutable sequential data structure 108. Physical asset transfer details 324 may include for example physical asset transfer profile identification, bill of lading/connaissement, weight of physical asset transfer, SKID number, collect on delivery and time of pickup request. External party details 328 may include any of all information pertaining to external parties who may be participating in physical asset transfer. External party details 328 may be stored or substantiated as one or more digitally signed textual elements in immutable sequential data structure 108. External party details 328 may include for example, information of consignee, controlling customer and/or party initiating physical asset transfer. Contract info 332 may include any and all information pertaining to a contract. Contract info 332 may be stored or substantiated as one or more digitally signed textual elements in immutable sequential data structure 108. Contract info 332 may include for example, name. street address, city, state and zip code.

With continued reference to FIG. 3, attestation 336 may include any and all data pertaining to moments of attestation. Attestation 336 may be stored or substantiated as one or more digitally signed textual elements in immutable sequential data structure 108. Attestation 336 may include for example, data pertaining to previous validity flags generated by reviews which may include attestation and/or error flags. Attestation 336 may include data surrounding previous reconciliation statuses. Attestation 336 may include details such as for example whether a reviewer is an authorization reviewer, and/or attestation status. Attestation status may include labels such as pending, inaccurate, and/or accurate. Pending status may include if no action has yet been taken by a validator for a given physical asset transfer data to be reviewed, then pending status may be the default physical asset transfer status. Inaccurate status may include a status that is invoked when at least a validator has raised a validity flag such as an error flag. Accurate status may include a status that is invoked when at least a validator has raised a validity flag such as an error flag. Attestation 336 may be further segmented into ownable 340 and sealable 344 attestations. Accessorial details may include any and all data that may pertain to all accessories' that contribute to the overall physical asset transfer process as recorded by any of the carriers participating in the physical asset transfer process. Accessorial details may include agnostic accessorial 348 which may include details such as reconsignment, storage fee, customer clearance, ferry charge and other details. Agnostic accessorial 348 may be stored or substantiated as one or more digitally signed textual elements in immutable sequential data structure 108. Accessorial details may include delivery accessorial 1 352 which may include details such as appointment details, arbitrary fee, cash on delivery fee, construction site, detention, express, guaranteed AM, guaranteed PM, holiday and inside. Delivery accessorial 1 352 may be stored or substantiated as one or more digitally signed textual elements in immutable sequential data structure 108. Accessorial details may include delivery accessorial 2 356 which may include details such as life gate, limited access, lumper, mine site, pier site, redelivery, residence, Saturday or Sunday, sort and segregate. Delivery accessorial 2 356 may be stored or substantiated as one or more digitally signed textual elements in immutable sequential data structure 108. Accessorial details may include pickup accessorial 360 which may include details such as limited access and residence. Pickup accessorial 360 may be stored or substantiated as one or more digitally signed textual elements in immutable sequential data structure 108. Accessorial details may include shared accessorial 364 which may include hazmat, protect freeze and do not freeze details. Shared accessorial 364 may be stored or substantiated as one or more digitally signed textual elements in immutable sequential data structure 108. Different details of textual elements contained within FIG. 3 may be auditable 368 and/or sealable 372, which may indicate, respectively, that the elements may be reviewed and subjected to further attestation and/or correction, and that the elements may be rendered immutable and/or encrypted to prevent further modification and/or inspection.

Referring now to FIG. 4, an exemplary embodiment of a method 400 of distributed, cryptographically secured data validation is illustrated. At step 405, first validator receives a first instance of an immutable sequential data structure 108. Receiving first instance of an immutable sequential data structure 108 may include receiving a complete copy of immutable sequential data structure. Receiving first instance of an immutable sequential data structure 108 may include receiving at least a block of the immutable sequential data structure. Receiving first instance of an immutable sequential data structure 108 may include receiving a link to a copy of immutable sequential data structure and/or a portion or block of immutable sequential data structure as stored at another device, including without limitation at least a second data validator 112*a-n* and/or remote device 116. As a further non-limiting example, receiving first instance of an immutable sequential data structure 108 may include receiving a portion of immutable sequential data structure as stored at second validator 128*a-n*. A portion may include for example, physical asset transfer profile store 304, physical asset transfer profile 308, carrier details 312, interchanging details 316, invoicing details 320, physical asset transfer details 324, external party details 328, contract info 332, attestation 336, ownable 340, sealable 344, agnostic accessorial 348, delivery accessorial 1 352, delivery accessorial 2 356, pickup accessorial 360, shared accessorial 364, auditable 368, and/or sealable 372.

With continued reference to FIG. 4, first instance of an immutable sequential data structure 108 includes at least a first digitally signed textual element 112 containing at least a first physical asset transfer field 116 populated with a first physical asset transfer datum 120. A textual element as used herein includes a draft contract or agreement. Draft contract or agreement may include information pertaining to physical asset transfer. Draft contract or agreement may have a standard form; for instance, in a manner analogous to a form with fields to be filled in, draft contract or agreement may include one or more fields into which agreed-upon terms may be entered. In an embodiment, one or more fields into which agreed-upon terms may be entered may be auto generated, whereby a selection of choices are automatically presented, and a user selects an appropriate choice. One or more fields may include, without limitation for example, physical asset transfer profile store 304, physical asset transfer profile 308, carrier details 312, interchanging details 316, invoicing details 320, physical asset transfer details 324, external party details 328, contract info 332, attestation 336, ownable 340, sealable 344, agnostic accessorial 348, delivery accessorial 1 352, delivery accessorial 2 356, pickup accessorial 360, shared accessorial 364, auditable 368, and/or sealable 372. Entire draft contract may be included in first instance; alternatively or additionally, one or more elements or sub-elements of draft contract may be included, including without limitation one or more transactions making up at least a part of for example, physical asset transfer profile store 304, physical asset transfer profile 308, carrier details 312, interchanging details 316, invoicing details 320, physical asset transfer details 324, external party details 328, contract info 332, attestation 336, ownable 340, sealable 344, agnostic accessorial 348, delivery accessorial 1 352, delivery accessorial 2 356, pickup accessorial 360, shared accessorial 364, auditable 368, and/or sealable 372 User may include a user of any device located and/or in communication with system 100 such as first validator 104, second validator 128*a-n*, and/or remote device 132, and may interact with any such device by way of a graphical user interface, such as without limitation graphical user interfaces as described in exemplary embodiments and figures referenced below. User may also include an individual who may operate any device located and/or in communication with system 100. For example, a field box containing a selection of choices may be auto generated and a user may highlight a selection that is most appropriate by hovering a curser over a selection and clicking on it to select it. In yet another embodiment, one or more fields may be manually filled in by a user. For instance, user may manually fill in one or more fields using a keyboard to type into a field box user's selection. In an embodiment, one or more fields may include a combination of auto generated selections and/or manual responses. For example, a field box containing a list of auto generated selections that do not fit the needs of a user may have a manual fill in option that a user can select to generate a custom selection. First digitally signed textual element 112 may contain a digital signature. Digital signature may include any of the digital signatures as described above in reference to FIGS. 1-2. Digital signature may be generated according to any of the methodologies and/or steps as described above in reference to FIGS. 1-2. In an embodiment, first digitally signed textual element 112 may contain a digital signature linked to first validator 104. Digital signature linked to first validator 104 may include a digital signature that uniquely identifies first validator 104. Linking may include unique digital signature associated with first validator 104 whereby when digital signature generated by first validator 104 is presented, an identifier associated with first validator 104 is also presented. First validator 104 may sign textual elements containing unique digital signature linked to first device whereby other subsequent devices such as second validator 128*a-n* may use unique digital signature linked to first validator 104 to evaluate authenticity of first validator 104 as described in more detail below.

With continued reference to FIG. 4, at least a first physical asset transfer field 116 may be populated with a first physical asset transfer datum 120, which may include any transfer data as described above. First physical asset transfer datum 120 may be auto populated, self-reported, and/or any combination of the two, and/or may be entered according to any process as described in more detail above. First physical asset transfer datum 120 may be populated by first validator 104, at least a second validator 128*a-n*, and/or another party to physical asset transfer such as a user of second validator 128*a-n* and/or remote device 132. First physical asset transfer datum 120 may be filled in with a default value, which may be generated by first validator 104, second validator 128*a-n*, remote device 132, and/or user of any device. Default value may be obtained from previous shipment transactions involving first validator 104, any other party to a transaction to be memorialized according to method 400 and/or transactions belonging to any category or categories including the present transaction. First physical asset transfer datum 120 may include a dummy value or null value. In an embodiment, first physical asset transfer datum 120 may be left blank.

Still referring to FIG. 4, receiving the first instance of the immutable sequential data structure includes receiving a second digitally signed textual element 112 from at least a second validator 128*a-n*, wherein the second digitally signed textual element 112 further includes a reference to the at least a first physical asset transfer field 116. Reference to at the at least a physical asset transfer field 116 may include an identifier associated with the at least a physical asset transfer field, a location or index indicating a location of the at least physical asset transfer field within first instance of immutable sequential data structure, or the like; persons skilled in the art, upon reviewing the entirety of this disclosure, will be aware of various ways in which an element of data may reference a location and/or label associated with another element of data, such that the latter may be located. Second digitally signed textual element 112 further includes and at least a first validity flag 124. At least a first validity flag 124 may include any attestation or error flag as described above.

With continued reference to FIG. 4, one or more devices and/or users may post additional digitally signed transactions to attest to method 400. For example, an additional digitally signed transaction may be entered by second validator 128a-n, that has previously participated in a transaction, identifying first validator 104, for instance by posting to an address associated with first validator 104 and/or a private key possessed by first validator 104, as described in more detail above. Such a transaction may, for instance, identify a first validator 104 and/or second validator 128a-n as a valid and authentic party to a physical asset transfer transaction to be recorded or formalized according to method 400, and/or verifying that the device and/or user in question is who they say they are. First validator 104 may enter such a digitally signed transaction similarly identifying and/or validating a second validator 128a-n. Remote device 132 may enter such a digitally signed transaction similarly identifying and/or validating first validator 104, and/or second validator 128a-n. Subsequent validators and/or devices may authenticate previous validators and/or devices by evaluating digital signatures linked to previous validators and/or devices. For example, second validator 128a-n may evaluate at least a first digitally signed textual element 112 signed by first validator 104. Second validator 128a-n may evaluate first digitally signed textual element 112 signed by first validator 104 by evaluating digital signature linked to first device 104 contained within first digitally signed textual element 112. A first digitally signed textual element 112 containing a digital signature not recognizable by second validator 128a-n as being linked to first validator 104, may indicate a lack of authenticity of first digitally signed textual element 112 and may cause second validator 128a-n to raise a validity flag 124 containing an error flag as described in more detail below. In such an instance, this may alert subsequent devices and/or validators as to such as discrepancy. A first digitally signed textual element 112 containing a digital signature recognizable by second validator 128a-n as being linked to first validator 104, may include authenticity of first digitally signed textual element 112 and may cause second validator 128a-n to post an additional digitally signed textual element 112 attesting to authenticity of first validator 104. In yet another non-limiting example, second validator 128a-n may post an additional digitally signed textual element 112 attesting to authenticity of first validator 104 by generating a validity flag 124 such as an attestation as described in more detail below.

At step 410, and still referring to FIG. 4, first validator authenticates first instance of immutable sequential data structure 108. Authentication may include any process or procedure for authentication of an immutable sequential data structure 108 as described above in reference to FIG. 1. For instance, and without limitation, authentication may include evaluation of a hash or series of hashes to determine whether first instance contains a valid hash chain from a current or latest block in immutable sequential data structure 108 to a "genesis block"; in other words, for each block in first instance, first validator 104 may cryptographically hash a block and then compare an output of that process to a hash provided in first instance as a hash of the block. Where one or more other devices such as at least a second validator 126a-n and/or a remote device 132 have submitted signatures or other data indicating that first instance is authentic, first validator 104 may evaluate the signatures, for instance by decrypting the signatures using associated public keys. Persons skilled in the art, upon reviewing the entirety of this disclosure, will be aware of various steps and variations that may be used in authenticating an instance of an immutable sequential data structure.

At step 415, first validator generates at least a second validity flag indicating a determination by the first validator of the validity of the at least a first physical asset transfer field. Generation of at least a second validity flag may include generation of any validity flag as described above in reference to FIG. 1, and/or generation of any datum indicating whether validity flag is an attestation flag or an error flag; for instance, and for illustrative purposes only, a Boolean datum may be generated with a "1" or "true" value indicative of an attestation flag and a and a "0" or "false" value indicative of an error flag. In other words, generation of at least a second validity flag may include determination by first validator 104 whether first physical asset transfer datum is valid or invalid. Determination may be performed, without limitation, by comparison of a value stored in memory of first validator 104 to physical asset transfer datum and/or by comparison of a value entered by a user of first validator 104 to physical asset transfer datum. Determination may include comparison of first physical asset transfer datum to a physical asset transfer datum entered elsewhere in first instance of immutable sequential data structure 108, such as without limitation any element of for example, physical asset transfer profile store 304, physical asset transfer profile 308, carrier details 312, interchanging details 316, invoicing details 320, physical asset transfer details 324, external party details 328, contract info 332, attestation 336, ownable 340, sealable 344, agnostic accessorial 348, delivery accessorial 1 352, delivery accessorial 2 356, pickup accessorial 360, shared accessorial 364, auditable 368, and/or sealable 372. Comparison may include a direct comparison such as a numerical and/or string comparison; comparison may include a comparison of one standard datum, for instance such as a field where data may be entered via a drop-down entries as described above to another. Persons skilled in the art, upon reviewing the entirety of this disclosure, will be aware of various ways in which data may be compared as consistent with this disclosure.

At step 420, and with continued reference to FIG. 4, first validator 104 detects a conflict between at least a first validity flag and the at least a second validity flag. Detection of a conflict may include a detection that a validity flag of at least a first validity flag differs from a validity flag of at least a second validity flag. For instance, and without limitation, a second validator of at least a second validator 128a-n may post one or more validity flags indicating determinations by the second validator of accuracy or truth of one or more data in at least a first digitally signed textual element; first validator may compare data flags generated by first validator, as described above, to each of the one or more data flags, for instance comparing pairs of flags where each pair includes a flag generated by second validator pertaining to a give datum and a flag generated by first validator 104 pertaining to the same datum; if any one pair of compared flags differ, a conflict may be detected. Comparison may similarly be performed regarding validity flags generated by each of a plurality of second validators, where a conflict detected regarding any second validator as described above may qualify as detection of a conflict between at least a first validity flag and at least a second validity flag. Validity flags may be compared to each other according to any suitable form of comparison as described above.

At step 425, and still referring to FIG. 4, first validator 104 transmits an indication of detected conflict to at least a second validator 128a-n. Transmission may include transmission via any protocol for network communication, for instance as described below in reference to FIG. 9. First validator 104 may transmit to a second validator of the at least a second validator 128a-n that generated at least a validity flag conflicting with a at least a validity flag generated by first validator 104; first validator 104 may transmit the validity flag to each second validator that generated at least a validity flag conflicting with at least a second validity flag. Alternatively or additionally, first validator 104 may transmit indication to all second validators 128*a-n*.

Continuing to refer to FIG. 4, transmission may alternatively or additionally include generating at least a third digitally signed textual element at first validator 104. At least a third digitally signed textual element may be generated using any digitally signed signature as described above. In an embodiment, at least a third digitally signed textual element 112 may include a digital signature that may uniquely identify first validator 104. In an embodiment, at least a third digitally signed textual element 112 may include a digital signature that is the same as digital signature contained within first digitally signed textual element 112. In an embodiment, first digitally signed textual element 112 may contain a digital signature that is different from a digital signature included in at least a third digitally signed textual element 112. At least a third digitally signed textual element 112 includes a first reference to the at least a first physical asset transfer data field. First physical asset transfer data field may be associated with an identifier, which may be locally or globally unique, and/or with an identifier of a physical asset transfer contract or agreement or the like that memorializes a physical asset transfer to be memorialized according to method 400. In an embodiment, a standard number or other identifier may identify a given field within a contract or agreement, while a unique identifier may be used to distinguish contract or agreement from other contracts being posted to first instance of the immutable sequential data structure. First physical asset transfer data field may be associated with an identifier of a user who is performing physical asset transfer. For example, first reference may be to an identifier of user who is performing physical asset transfer which may include a unique identifier of user such as user's name or date of birth. In an embodiment, identifier of user may include a unique identifier that may be used to distinguish one user from another user and to link a user with a specific contract or agreement. For example, identifier may consist of a unique set of characters, numbers, letters, and/or any combination of the above which may link a contract or agreement with a specific user as well as distinguish contract or agreement from other contracts or agreements being posted to first instance of the immutable sequential data structure.

Still referring to FIG. 4, at least a third digitally signed textual element may include at least a second validity flag as described above; inclusion of at least a second validity flag in at least a third digitally signed textual element may be performed according to any process for inclusion of at least a first validity flag in at least a second digitally signed textual element. First validator 104 may posting the at least a third digitally signed textual element to the first instance of the immutable sequential data structure; posting to the first instance of the immutable sequential data structure may be performed in any manner suitable for posting a digitally signed transaction to an immutable sequential data structure as described above; posting may include adding to an active block of immutable sequential data structure, either a local copy of the immutable sequential data structure or a remote copy of the immutable sequential data structure by transmitting the at least a second digitally signed textual element 112 to another device and/or validator having a copy of an active block and/or of immutable sequential data structure; immutable sequential data structure with the at least a second digitally signed textual element 112 posted to it may be distributed to one or more other devices and/or validators including one or more devices and/or validators acting as participants in physical asset transfer contract or agreement, agreed to, and/or memorialized according to method 400. With continued reference to FIG. 4, after transmission, a reconciliation process may proceed as described above.

In an embodiment, and continuing to refer to FIG. 4, first validator 104 may receive a second instance of immutable sequential data structure 108; second instance may have additional entries in a current block, one or more additional blocks, or the like. Second instance of the immutable sequential data structure may include comprises at least a third digitally signed textual element containing at least a second physical asset transfer field populated with at least a second physical asset transfer datum of the physical asset transfer; second physical asset transfer field may include, without limitation, a physical asset transfer field that is associated with the same physical asset transfer to which first physical asset transfer is associated. For instance, and without limitation, at least a second physical asset transfer datum may include a modification of the first physical asset transfer datum. Modification may be performed, as a non-limiting example, as a result of a reconciliation process as described above; alternatively or additionally, modification may include or constitute an attempt by a user operating one of at least a second validator 128*a-n* to modify a previously posted physical asset transfer datum, for instance to correct an error and/or in response to a change of circumstances. As noted above, modification to a physical asset transfer datum may be prohibited by system 100 where all devices of a list of signing devices have performed attestations of the physical asset transfer datum. In an embodiment, first validator 104 may identify a list of signing devices; this may be performed by reference to a digitally signed textual element in first and/or second instance of immutable sequential data structure listing signing devices as described above, by retrieval of such a listing from a datastore and/or database on or accessible to first validator 104, by identifying an originating and/or first posting device and receiving the listing from that device, or the like. First validator 104 may determining that each device of the list of signing devices has posted an attestation of the at least a first physical asset transfer datum as described above in reference to FIG. 1 and reject the at least a second physical asset transfer datum. Rejection may include, without limitation, posting an error flag as described above to indicate an improper modification, refusing authentication of second instance and/or a block of second instance containing at least a second physical asset transfer datum, and/or ignoring at least a second physical asset transfer datum in future iterations of methods disclosed herein, such as method 400. Alternatively, first validator 104 may determine that at least a device of the list of signing devices has not posted an attestation of the at least a first physical asset transfer datum; first validator 104 may then proceed with validation of at least a second physical asset transfer datum, for instance as described above. As a non-limiting example, first validator 104 may generate least a fourth digitally signed textual element including at least a first reference to the at least a first physical asset transfer, at least a first reference to the at least a second physical asset transfer, and at least a third validity flag. First validator 104 may post the at least a fourth digitally signed textual element to the immutable sequential data structure.

Still referring to FIG. 4, at least a second physical asset transfer datum may not include a modification of the first physical asset datum; for instance, at least a second physical asset transfer datum may include a datum referring to a later stage in physical asset transfer as described in reference to FIG. 5, below. First validator 104 may engage in any processes as described herein regarding at least a second physical asset transfer datum. For instance, and without limitation, first validator 104 may generate least a fourth digitally signed textual element including at least a first reference to the at least a first physical asset transfer, at least a first reference to the at least a second physical asset transfer, and at least a third validity flag; first validator 104 may post the at least a fourth digitally signed textual element to the immutable sequential data structure.

With continued reference to FIG. 4, steps of method 400 may be repeated one or more times for different checkpoints, which may correspond to stages in a physical asset transfer process. Referring now to FIG. 5, a method 500 for receiving a second textual element of an immutable sequential data structure at a first validator is illustrated. At step 505, first validator 104 receives a second textual element of an immutable sequential data structure, wherein the second textual element of the immutable sequential data structure includes at least a second digitally signed textual element 112 containing at least a second physical asset transfer field 116 populated with at least a second physical asset transfer datum 120. Receiving a second textual element of an immutable sequential data structure 108 may include receiving at least a block of the immutable sequential data structure and/or receiving a link to a copy of the immutable sequential data structure as described in more detail above in FIG. 4. Second textual element of the immutable sequential data structure includes at least a second digitally signed textual element 112 containing at least a second physical asset transfer field 116 populated with at least a second physical asset transfer datum 120. Textual element may include any of the textual elements such as a draft contract or agreement as described above in FIG. 4. Second digitally signed textual element 112 may contain a digital signature. Digital signature may include any of the digital signatures as described above in reference to FIGS. 1-3. In an embodiment, digitally signed textual element 112 containing at least a second physical asset transfer field 116 may include by digitally signed by another validator such as second validator 128*a-n* and/or remote device 132. In such an instance, digitally signed textual element 112 containing at least a second physical asset transfer signed by another validator may contain a digital signature that uniquely identifies the other validator. For example, second validator 128*a-n* and/or remote device 132 may each generate a digital signature that uniquely identifies each device. In an embodiment, second textual element of an immutable sequential data structure may include at least a second digitally signed textual element 112 which may be signed by first validator 104.

Figure 5:
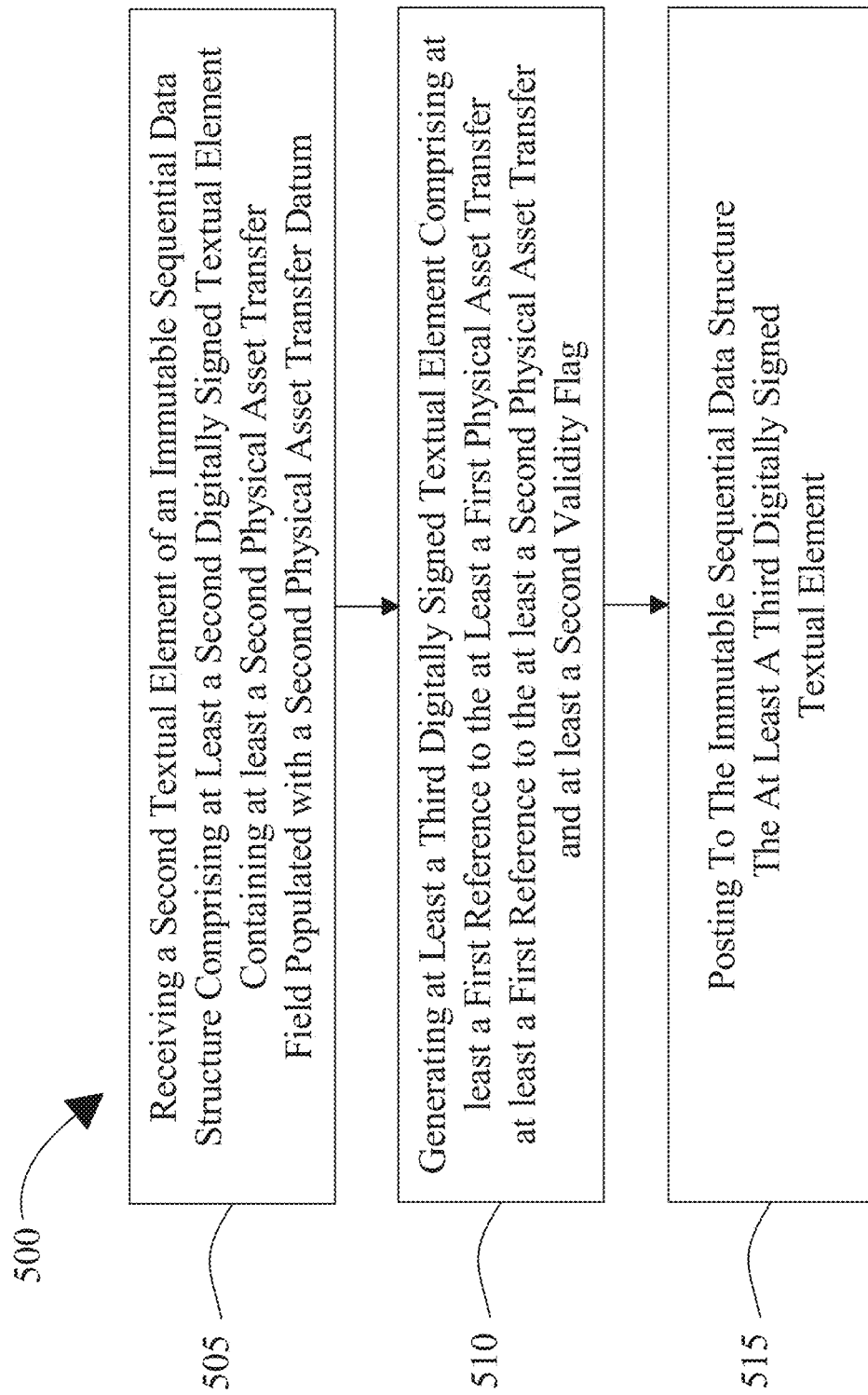
FIG. 5 is a flow diagram illustrating an exemplary method of receiving a second textual element of an immutable sequential data structure is illustrated.

With continued reference to FIG. 5, second textual element of the immutable sequential data structure includes at least a second physical asset transfer field 116 populated with at least a second physical asset transfer datum 120. At least a second physical asset transfer datum 120 may include any information about physical asset transfer as described above in reference to FIG. 4. This may include information such as but not limited to nature of the transfer, number of units to be transferred, labeling, country of origin, transfer times, transfer destination, number of checkpoints, customer, supplier and the like. At least a second physical asset transfer datum 120 may be auto populated, self-reported and/or any combination of the two as described in more detail above in FIGS. 1-3.

With continued reference to FIG. 5, at step 510 first validator generates at least a third digitally signed textual element 112. At least a third digitally signed textual element 112 may include any digitally signed signature as described above. At least a third digitally signed textual element 112 may include at least a first reference to the at least a first physical asset transfer, at least a first reference to the at least a second physical asset transfer, and at least a second validity flag 124. At least a first reference to the at least a first physical asset transfer may include any identifier which may be locally or globally unique, and/or associated with an identifier of physical asset transfer contract or agreement or the like that memorializes a physical asset transfer to be memorialized according to method 400. At least a first reference to the at least a first physical asset transfer may include an identifier of validator and/or user engaged in generating first reference. At least a first reference to the at least a second physical asset transfer may include any of the references as described above in FIGS. 1-4. At least a first reference to the at least a second physical asset transfer may include a unique identifier that identifies validator and/or user performing an attestation to the at least a second physical asset transfer. In an embodiment, at least a first reference to the at least a second physical asset transfer may be linked to at least a first reference to the at least a first physical asset transfer. Linking may include both references being presented and/or transmitted together whereby the chain of attestation can be followed. The at least a third digitally signed textual element 112 includes at least a second validity flag 124. Validity flag 124 may include any datum as described above in FIGS. 1-3 that indicates whether first validator 104 agrees or disagrees with second textual element of the immutable sequential data structure. Second validity flag 124 may include an attestation which may include any of the attestations as described above in FIGS. 1-3. Attestation may be equivalent to signing a contract confirming accuracy of at least a second physical asset transfer datum 120 by first validator 104. Second validity flag 124 may include an error flag which may include any of the error flags as described above in FIGS. 1-3. Error flag may indicate that first validator 104 does not agree as to the accuracy of at least a second physical asset transfer datum 120. Error flag may indicate that an agreement has not yet been reached regarding the terms described in at least a second physical asset transfer datum 120 and that a reconciliation process between parties to the physical asset transfer transaction may be necessary. Reconciliation process may include any of the processes and methods as described above in reference to FIGS. 1-3. Reconciliation process may include an arbitration processes that may include second validator 128*a-n* and/or remote device 132 when a consensus is unable to be reached such as between first validator 104 and/or second validator 128*a-n*. Arbitration process may include any of the arbitration processes and methods as described above in FIGS. 1-3. In an embodiment, the at least a second validity flag 124 may be transmitted to a second device. Transmission may include any communication channel as described above in reference to FIGS. 1-3. Second device may include any other device operating within system 100, which may include for example, second validator 128*a-n*, and/or remote device 132. In an embodiment, the at least a second validity flag 124 may be transmitted to a second device to perform subsequent attestations. For example, at least a first device such as first validator 104 may perform an attestation and generate at least a second validity flag 124 and transmit the at least a second validity flag 124 to at least a second device to perform a subsequent attestation in the physical asset transfer process. In yet another non-limiting example, at least a second validity flag 124 consisting of an error flag may be transmitted to at least a second device such as second validator 128*a*-*n* and/or remote device 132 to perform a reconciliation, when other such devices may not be in agreement as to the error flag.

With continued reference to FIG. 5, at step 515 first validator posts to the immutable sequential data structure the at least a third digitally signed textual element 112. Posting to the immutable sequential data structure may be performed in any manner suitable for posting a digitally signed transaction to an immutable sequential data structure as described above in FIGS. 1-3. Posting may include posting to an active block of the immutable sequential data structure which may include either a local copy of the immutable sequential data structure or a remote copy. Posting may be done in any suitable form, which may include in machine-readable forms and/or encoded forms as described in more detail above in FIG. 4.

Figure 6:
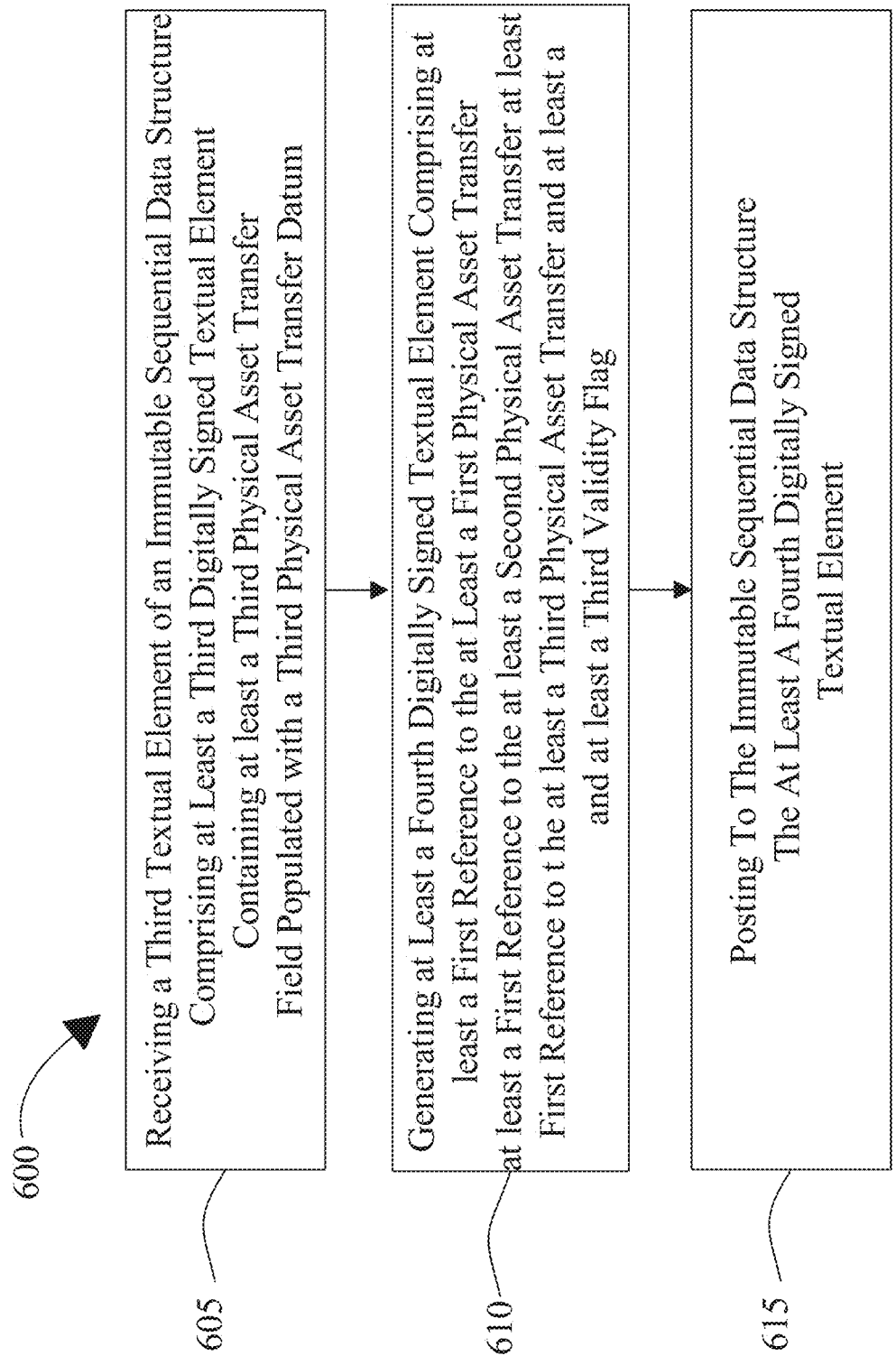
FIG. 6 is a flow diagram illustrating an exemplary method of receiving a third textual element of an immutable sequential data structure is illustrated.

Referring now to FIG. 6, a method 600 of receiving a third textual element of an immutable sequential data structure at a first validator is illustrated. At step 605, first validator 104 receives a third textual element of an immutable sequential data structure, wherein the third textual element of the immutable sequential data structure includes at least a third digitally signed textual element 112 containing at least a third physical asset transfer field 116 populated with a third physical asset transfer datum 120. Receiving a third textual element of an immutable sequential data structure 108 may include receiving at least a block of the immutable sequential data structure and/or receiving a link to a copy of the immutable sequential data structure as described in more detail above in FIGS. 3-4. Third textual element of the immutable sequential data structure includes at least a third digitally signed textual element 112 containing at least a third physical asset transfer field 116 populated with a third physical asset transfer datum 120. Textual element may include any of the textual elements such as a draft contract or agreement as described above in FIGS. 3-4. Third digitally signed textual element 112 may contain a digital signature. Digital signature may include any of the digital signatures as described above in reference to FIGS. 1-4. In an embodiment, digitally signed textual element 112 containing at least a third physical asset transfer field 116 may be digitally signed by another validator such as second validator 128*a*-*n* and/or remote device 132. In such an instance, digitally signed textual element 112 containing at least a third physical asset transfer signed by another validator may contain a digital signature that uniquely identifies the other validator. For example, second validator 128*a*-*n* and/or remote device 132 may each generate a digital signature that uniquely identifies each validator. Each digital signature produced by each device may be uniquely linked to each device, whereby each time each device generates a signature it is unique to that device and can be linked back to that device. In an embodiment, third textual element of an immutable sequential data structure may include at least a third digitally signed textual element 112 which may be signed by first validator 104.

With continued reference to FIG. 6, third textual element of the immutable sequential data structure includes at least a third physical asset transfer field 116 populated with a third physical asset transfer datum 120. Third physical asset transfer datum 120 may include any information about physical asset transfer as described above in reference to FIGS. 3-4. This may include information such as but not limited to nature of the transfer, number of units to be transferred, labeling, country of origin, transfer times, transfer destination, number of checkpoints, customer, supplier and the like. Third physical asset transfer datum 120 may be auto populated, self-reported and/or any combination of the two as described in more detail above in FIGS. 1-4.

With continued reference to FIG. 6, at step 610 first validator generates at least a fourth digitally signed textual element 112. At least a fourth digitally signed textual element 112 may include any digitally signed signature as described above. At least a fourth digitally signed textual element 112 may include at least a first reference to the at least a first physical asset transfer, at least a first reference to the at least a second physical asset transfer, at least a first reference to the at least a third physical asset transfer and at least a third validity flag 124. At least a first reference to the at least a first physical asset transfer may include any identifier which may be locally or globally unique, and/or associated with an identifier of physical asset transfer contract or agreement or the like that memorializes a physical asset transfer to be memorialized according to method 400. At least a first reference to the at least a first physical asset transfer may include an identifier of validator and/or user engaged in generating first reference. At least a first reference to the at least a second physical asset transfer may include any of the references as described above in FIGS. 1-4. At least a first reference to the at least a second physical asset transfer may include a unique identifier that identifies validator and/or user performing an attestation to the at least a second physical asset transfer. At least a first reference to the at least a third physical asset transfer may include a unique identifier that identifies validator and/or user performing an attestation to the at least a third physical asset transfer. In an embodiment, at least a first reference to the at least a third physical asset transfer may be linked to at least a first reference to the at least a first physical asset transfer and the at least a first reference to the at least a second physical asset transfer. Linking may include both references being presented and/or transmitted together whereby the chain of attestation can be followed. The at least a fourth digitally signed textual element 112 includes at least a third validity flag 124. Validity flag 124 may include any datum as described above in FIGS. 1-4 that indicates whether first validator 104 agrees or disagrees with third textual element of the immutable sequential data structure. Third validity flag 124 may include an attestation which may include any of the attestations as described above in FIGS. 1-3. Attestation may be equivalent to signing a contract confirming accuracy of third physical asset transfer datum 120 by first validator 104. Third validity flag 124 may include an error flag which may include any of the error flags as described above in FIGS. 1-3. Error flag may indicate that first validator 104 does not agree as to the accuracy of third physical asset transfer datum 120. Error flag may indicate that an agreement has not yet been reached regarding the terms described in third physical asset transfer datum 120 and that a reconciliation process between parties to the physical asset transfer transaction may be necessary. Reconciliation process may include any of the processes and methods as described above in reference to FIGS. 1-3. Reconciliation process may include an arbitration processes that may include second validator 128*a*-*n* and/or remote device 132 when a consensus is unable to be reached such as between first validator 104 and/or second validator 128*a*-*n*. Arbitration process may include any of the arbitration processes and methods as described above in FIGS. 1-4. In an embodiment, the at least a third validity flag 124 may be transmitted to a second device. Transmission may include any communication channel as described above in reference to FIGS. 1-4. Second device may include any other device operating within system 100, which may include for example, second validator 128*a-n*, and/or remote device 132. In an embodiment, the at least a third validity flag 124 may be transmitted to a second device to perform subsequent attestations. For example, at least a first device such as first validator 104 may perform an attestation and generate at least a third validity flag 124 and transmit the at least a third validity flag 124 to at least a second device to perform a subsequent attestation in the physical asset transfer process. In yet another non-limiting example, at least a third validity flag 124 consisting of an error flag may be transmitted to at least a second device such as second validator 128*a-n* and/or remote device 132 to perform a reconciliation, when other such devices may not be in agreement as to the error flag.

With continued reference to FIG. 6, at step 615 first validator posts to the immutable sequential data structure the at least a fourth digitally signed textual element 112. Posting to the immutable sequential data structure may be performed in any manner suitable for posting a digitally signed transaction to an immutable sequential data structure as described above in FIGS. 1-4. Posting may include posting to an active block of immutable sequential data structure which may include either a local copy of the immutable sequential data structure or a remote copy. Posting may be done in any suitable form, which may include in machine-readable forms and/or encoded forms as described in more detail above in FIGS. 3-4.

Figure 7:
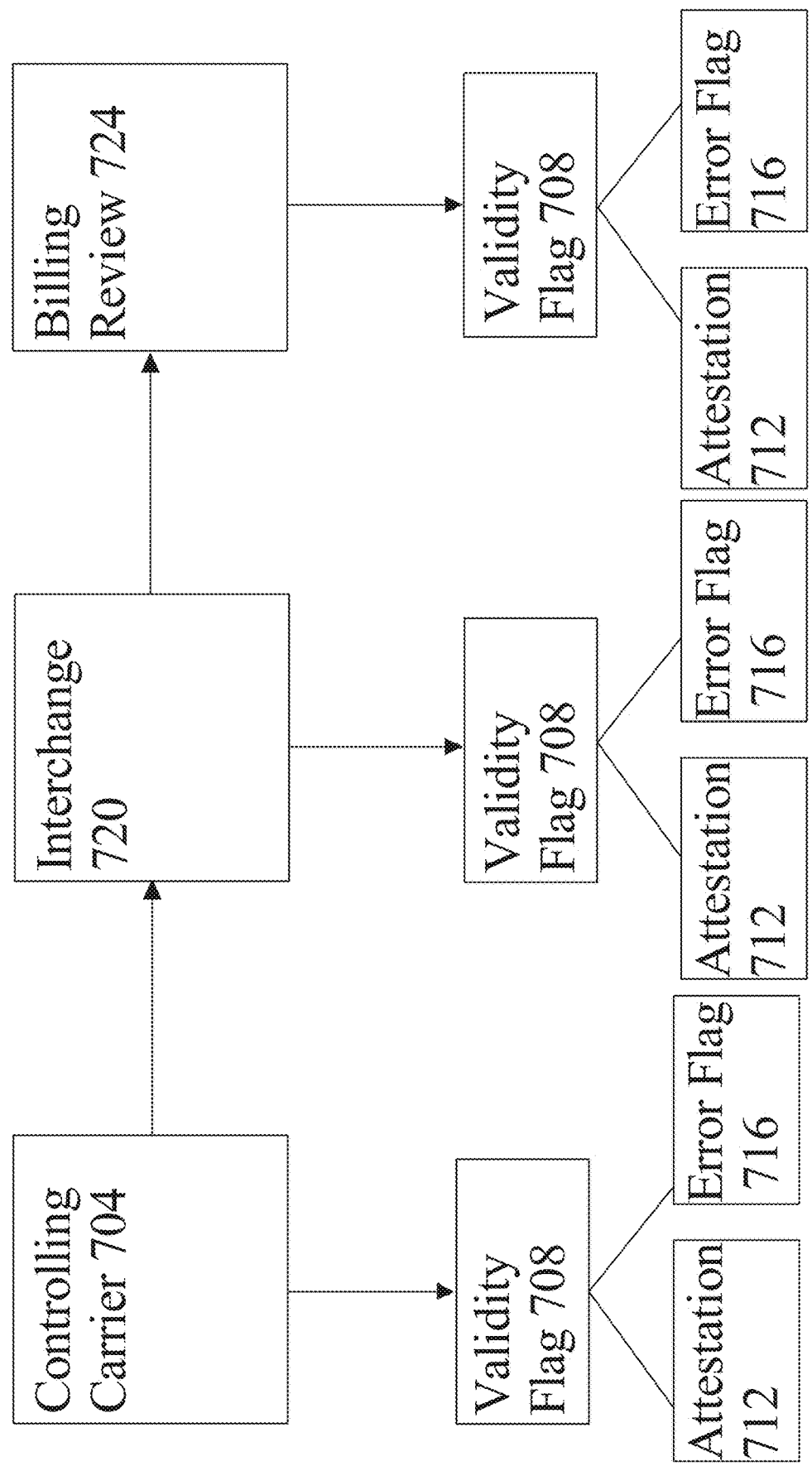
FIG. 7 is a process flow diagram illustrating exemplary embodiments of attestations in a physical asset transfer.

Referring now to FIG. 7, a process flow diagram of different attestations in a physical asset transfer process are illustrated. Controlling carrier 704 may include a first checkpoint that may perform an attestation and generation of a validity flag 708. Controlling carrier 704 may evaluate for instance, an attestation by parties to a first leg of an asset transfer, or to an initial process of packaging physical asset transfer. In an embodiment, attestation may certify that physical asset transfer data is valid for future use such as invoicing and settlement. This may ensure for example, that data generated during the course of the physical asset transfer has been certified as valid and independently attested for subsequent future use. Controlling carrier may include data review and attestation for a physical asset transfer. Controlling carrier 704 may include carrier details and attestation of a contract or agreement that may govern the terms of physical asset transfer. Controlling carrier 704 may perform an attestation by generating a validity flag 708. Validity flag 708 may include any of the validity flags 708 as described above in reference to FIG. 4. Validity flag 708 may include an attestation 712 and/or an error flag 716. Attestation 712 may include any of the attestations 712 as described above in FIGS. 1-5. Error flag 716 may include any of the error flags as described above in FIGS. 1-5. In an embodiment, after attestation has been performed by controlling carrier 704, interchange 720 may include a second checkpoint that may perform an attestation and generation of a validity flag 708. Interchange 720 may include evaluation and attestation of a second leg of the physical asset transfer, of a process for transferring physical assets from a first container or vehicle to a second, of changing a driver from the first leg of the physical asset transfer to the second leg of the physical asset transfer or the like. Interchange 720 may also include evaluation and attestation around interchanging information and data points such as "interchange gateway code," "interchange zip code," and "driver company." Interchange 720 may be associated with interchange details and attestation contracts. Interchange 720 may include any of the validity flags 708 as described above in reference to FIG. 4. Validity flag 708 may include an attestation 712 and/or an error flag 716. Attestation 712 may include any of the attestations 712 as described above in FIGS. 1-5. Error flag 716 may include any of the error flags as described above in FIGS. 1-5. In an embodiment, after attestation has been performed by interchange 720, billing review 724 may include a third checkpoint that may perform an attestation and generation of a validity flag 708. Billing review 724 may include evaluation and attestation of a third leg of the physical asset transfer, as well as costs associated with the physical asset transfer. Billing review 724 may include attestation and generation of a validity flag 708 pertaining to for example but not limited to, shipment details, agnostic accessories, delivery accessories, pick up accessories, and/or shared accessories. Billing review 724 may include any of the validity flags 708 as described above in reference to FIG. 4. Validity flag 708 may include an attestation 712 and/or an error flag 716. Attestation 712 may include any of the attestations 712 as described above in FIGS. 1-5. Error flag 716 may include any of the error flags as described above in FIGS. 1-5. In an embodiment, contract or agreement governing physical asset transfer may be divided into different checkpoints that may enable all parties to agree to processes physical asset transfer at particular stages of the physical asset transfer, when it is possible for all parties to be aware of likely physical asset transfer parameters. For example, a party that is going to perform the physical asset transfer on the second leg of the physical asset transfer may wish to verify the conditions of the physical asset transfer and/or determine what packaging or equipment must be involved in the physical asset transfer, prior to attesting to terms describing such conditions, packaging, or equipment. By attesting and dividing portions of the contract or agreement governing the physical asset transfer, method 400 may enable parties to agree to some portions of a shipment process while permitting them flexibility to negotiate and reassess subsequent portions. In an embodiment, attestations may be performed at various stages of the physical asset transfer. Attestations may be categorized and named to reflect task that is being attested to. For example, attestations may include physical asset transfer profile store, physical asset transfer profile, carrier details, attestation, interchange details, physical asset transfer details, agnostic accessories 1, delivery accessories 2, pick up accessories, and/or shared accessories. In an embodiment, physical asset transfer profile may contain information related to a specific physical asset transfer. Physical asset transfer profile may include for example, carrier details, interchange details, invoicing details, physical asset transfer details, external parties' details, and moments of attestations between participating identities (carrier or carrier controlled).

Figure 8A:
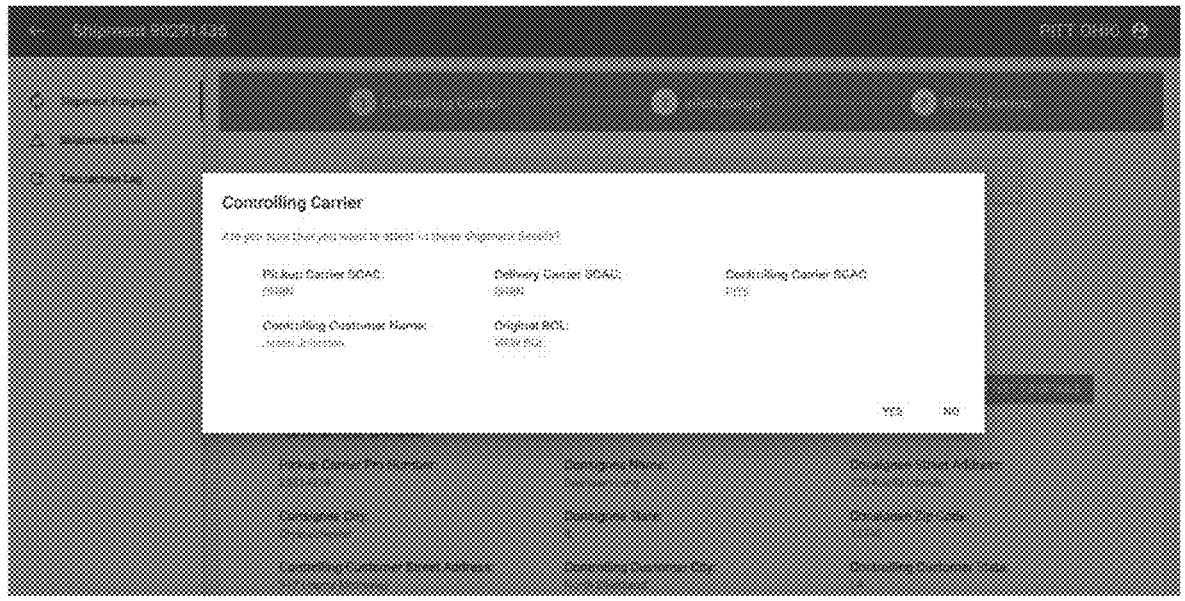
Figure 8B:
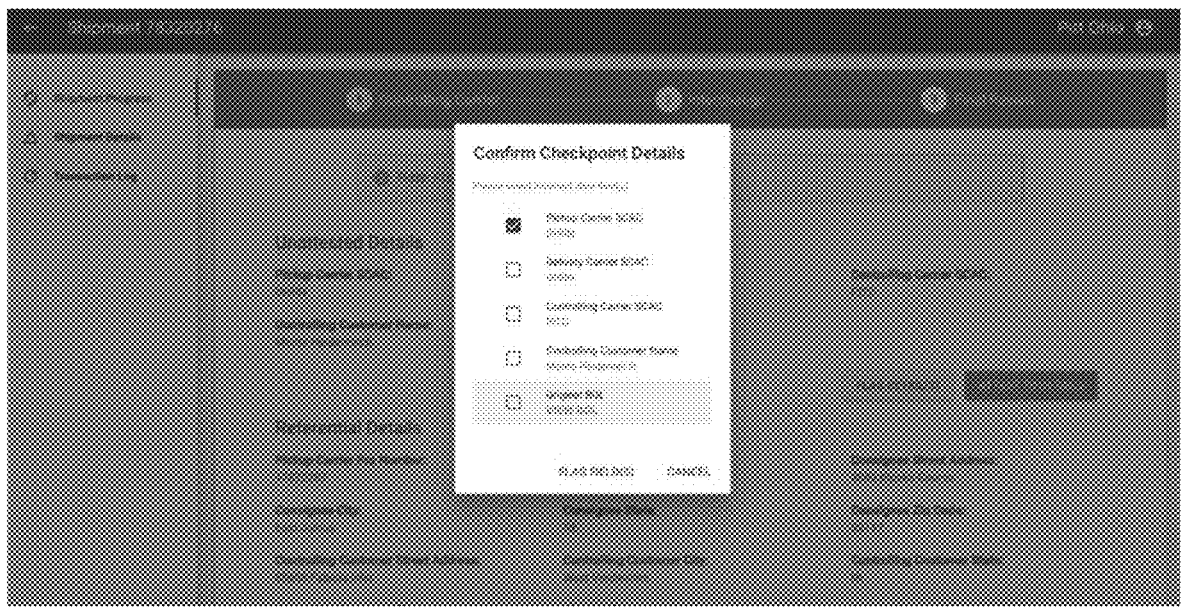
Figure 8C:
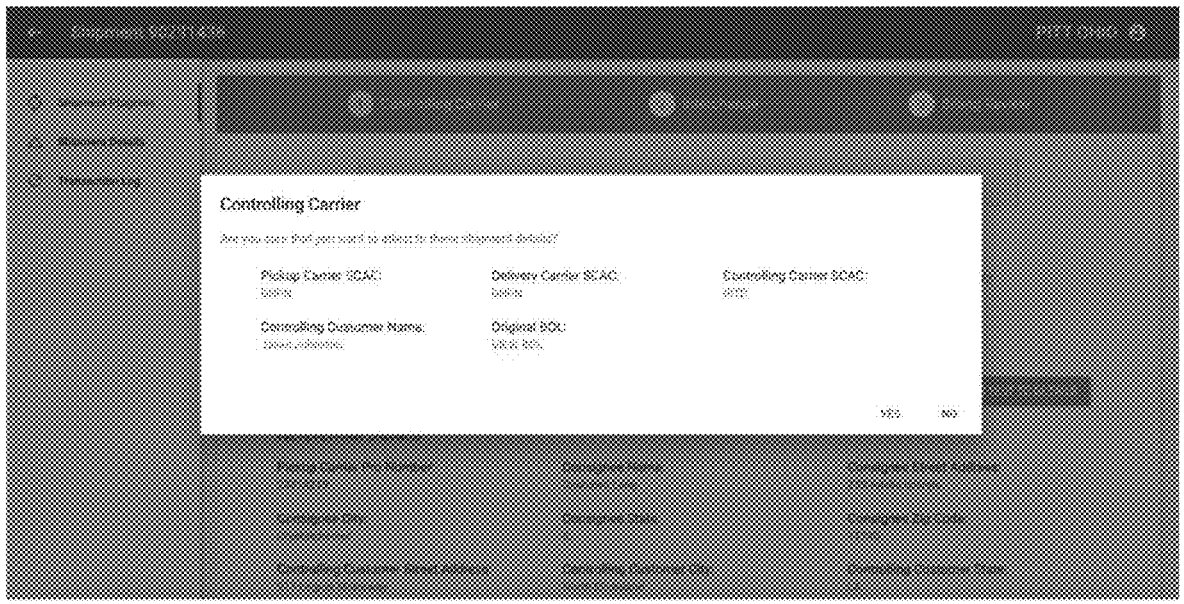
Figure 8D:
Figure 8E:
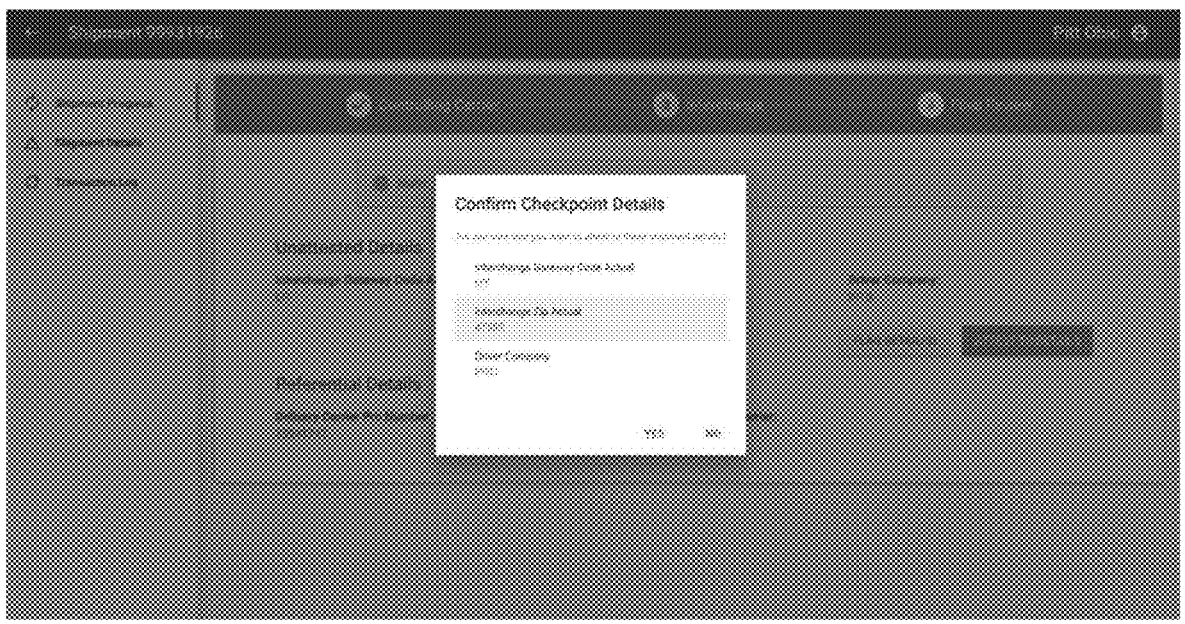
Figure 8F:
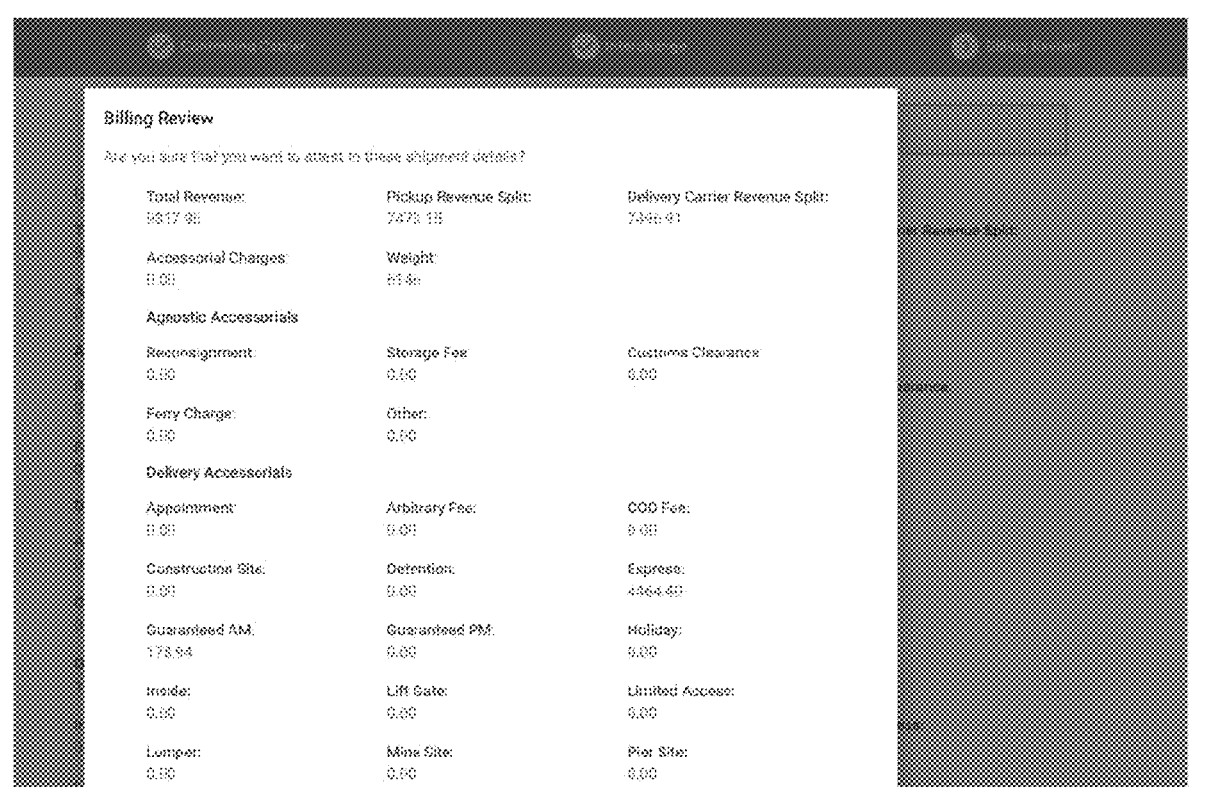

Referring now to FIG. 8A-F screenshots illustrating exemplary embodiments of a graphical user interface (GUI) that a user may interact with and/or use to perform steps and processes in any of the methods described in this disclosure. GUI may function to translate machine-readable data into one or more fields, buttons, or the like into which users may enter commands indicating, as a non-limiting example, physical asset transfer data and/or validity flags. For instance, and for illustrative purposes only, FIG. 5A shows an initial step of data review and attestation for a physical asset transfer at controlling carrier attestation stage. In an embodiment controlling carrier may attest carrier details 312 and attestation of contract information 332 as described above in FIG. 3. FIG. 5B shows a pop-up screen that allows a user to select fields with bad data and generate an error flag by selecting "flag details." FIG. 5C shows a screen where a user can review data they are attesting to and confirm or cancel the attestation. Confirming the attestation may allow the user to proceed on to the next checkpoint, while canceling the attestation may result in fetching new data and/or a reconciliation as described in more detail above in FIGS. 1-7. FIG. 5D shows a step of data review and attestation at interchange. In an embodiment, interchange may allow for data pertaining to interchange gateway code, interchange zip code, and/or driver company to be modified and/or generate validity flag as to this information. FIG. 8E shows confirmation of interchange attestation details. FIG. 8F shows an exemplary embodiment of a billing review attestation moment and seal physical asset transfer option.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
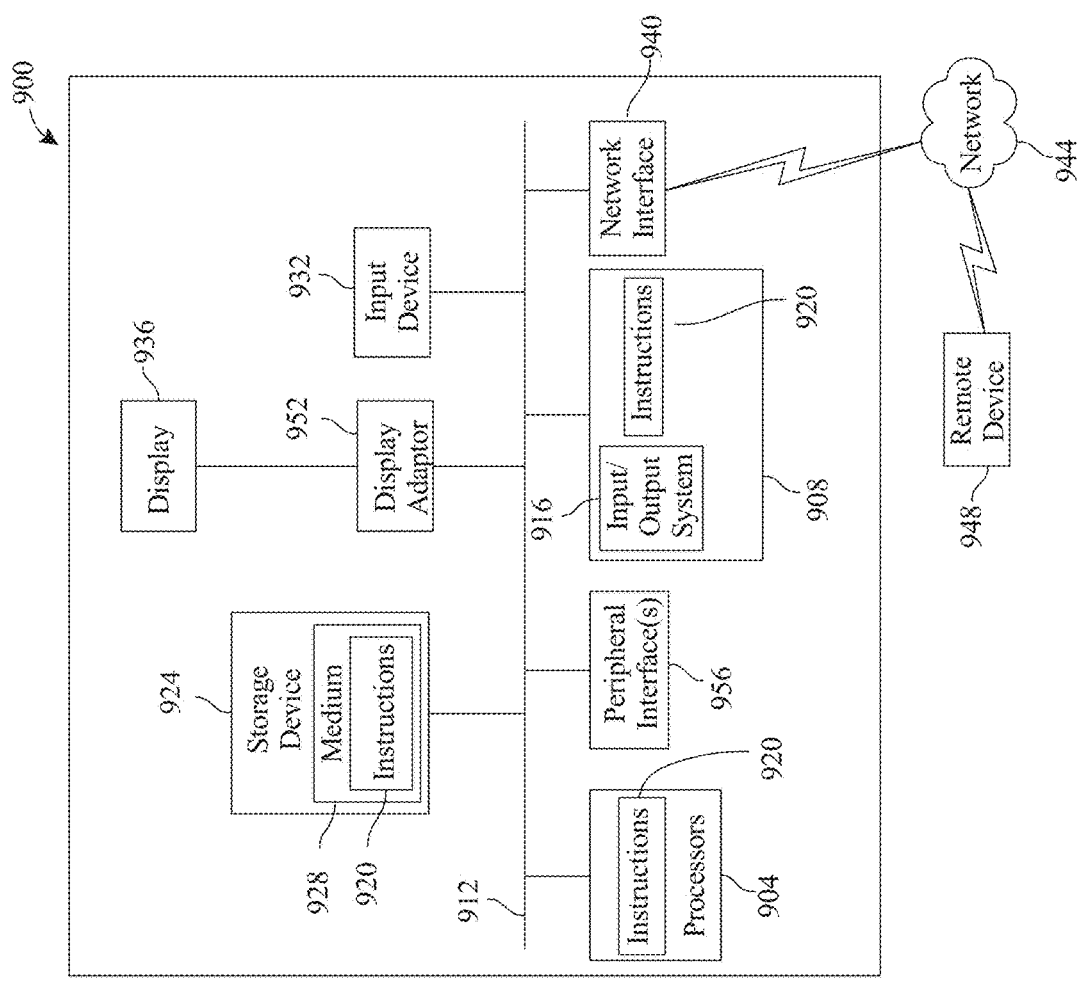
FIG. 9 is a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system, such as the 100 system of FIG. 1, to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of distributed, cryptographically secured data validation, the method comprising:
   receiving, at a first validator, a first instance of an immutable sequential data structure, wherein the first instance of the immutable sequential data structure includes:
      at least a first digitally signed textual element containing at least a first physical asset transfer field populated with at least a first physical asset transfer datum of a physical asset transfer; and
      at least a second digitally signed textual element generated by at least a second validator, the at least a second digitally signed textual element containing a reference to the at least a first digitally signed textual element and at least a first validity flag indicating a determination by the at least a second validator of the validity of the at least a first physical asset transfer field;
   authenticating, at the first validator, the first instance of the immutable sequential data structure;
   generating, at the first validator, at least a second validity flag indicating a determination by the first validator of the validity of the at least a first physical asset transfer field;
   detecting, at the first validator, a conflict between the at least a first validity flag and the at least a second validity flag; and
   transmitting, by the first validator and to the at least a second validator, an indication of the conflict.

2. The method of claim 1, wherein receiving the first instance of the immutable sequential data structure further comprises receiving at least a block of the immutable sequential data structure.

3. The method of claim 1, wherein receiving the first instance of the immutable sequential data structure further comprises receiving a link to the immutable sequential data structure.

4. The method of claim 1, wherein:
   the at least a first validity flag includes an attestation; and
   the at least a second validity flag includes an error flag.

5. The method of claim 1, wherein:
   the at least a first validity flag includes an error flag; and
   the at least a second validity flag includes an attestation.

6. The method of claim 1, wherein transmitting further comprises:
   generating, at the first validator, at least a third digitally signed textual element, wherein the at least a third digitally signed textual element further comprises:
      a second reference to the at least a first physical asset transfer field; and
      the at least a second validity flag; and
   posting, to the first instance of the immutable sequential data structure, the at least a third digitally signed textual element.

7. The method of claim 1 further comprising:
   receiving, at the first validator, a second instance of the immutable sequential data structure, wherein the second instance of the immutable sequential data structure further comprises at least a third digitally signed textual element containing at least a second physical asset transfer field populated with at least a second physical asset transfer datum of the physical asset transfer.

8. The method of claim 7, wherein the at least a second physical asset transfer datum is a modification of the at least a first physical asset transfer datum.

9. The method of claim 8 further comprising:
identifying a list of signing devices;
determining that each device of the list of signing devices has posted an attestation of the at least a first physical asset transfer datum; and
rejecting the at least a second physical asset transfer datum.

10. The method of claim 8 further comprising:
identifying a list of signing devices;
determining that at least a device of the list of signing devices has not posted an attestation of the at least a first physical asset transfer datum;
generating at the first validator, least a fourth digitally signed textual element, wherein the at least a fourth digitally signed textual element further comprises:
at least a first reference to the at least a first physical asset transfer;
at least a first reference to the at least a second physical asset transfer; and
at least a third validity flag; and
posting, to the immutable sequential data structure, the at least a fourth digitally signed textual element.

11. The method of claim 7, wherein the at least a second physical asset transfer datum is not a modification of the at least a first physical asset transfer datum.

12. The method of claim 11 further comprising:
generating at the first validator, least a fourth digitally signed textual element, wherein the at least a fourth digitally signed textual element further comprises:
at least a first reference to the at least a first physical asset transfer datum;
at least a first reference to the at least a second physical asset transfer datum; and
at least a third validity flag; and
posting, to the immutable sequential data structure, the at least a fourth digitally signed textual element.

13. A system for distributed, cryptographically secured data validation, the system comprising:
a first validator, the first validator comprising a computing device and wherein the first validator is designed and configured to:
receive a first instance of an immutable sequential data structure; wherein the first instance of the immutable sequential data structure includes:
at least a first digitally signed textual element containing at least a first physical asset transfer field populated with at least a first physical asset transfer datum of a physical asset transfer; and
at least a second digitally signed textual element generated by at least a second validator, the at least a second digitally signed textual element containing a reference to the at least a first digitally signed textual element and at least a validity flag indicating a determination by the at least a second validator of the validity of the at least a first physical asset transfer field;
authenticate the first instance of the immutable sequential data structure;
generate at least a second validity flag indicating a determination by the first validator of the validity of the at least a first physical asset transfer field;
detect a conflict between the at least a first validity flag and the at least a second validity flag; and
transmit, to the at least a second validator, an indication of the conflict.

14. The system of claim 13, wherein the first validator is configured to receive the first instance of the immutable sequential data structure by receiving at least a block of the immutable sequential data structure.

15. The system of claim 13, wherein the first validator is configured to receive the first instance of the immutable sequential data structure by receiving a link to the immutable sequential data structure.

16. The system of claim 13, wherein:
the at least a first validity flag includes an attestation; and
the at least a second validity flag includes an error flag.

17. The system of claim 13, wherein:
the at least a first validity flag includes an error flag; and
the at least a second validity flag includes an attestation.

18. The system of claim 13, wherein the first validator is further configured to:
generate at least a third digitally signed textual element, wherein the at least a third digitally signed textual element further comprises:
a second reference to the at least a first physical asset transfer field; and
the at least a second validity flag; and
post to the first instance of the immutable sequential data structure, the at least a third digitally signed textual element.

19. The system of claim 13, wherein the first validator is further configured to receive a second instance of the immutable sequential data structure, wherein the second instance of the immutable sequential data structure further comprises at least a third digitally signed textual element containing at least a second physical asset transfer field populated with a at least a second physical asset transfer datum of the physical asset transfer.

20. The system of claim 19, wherein the first validator is configured to:
generating least a fourth digitally signed textual element, wherein the at least a fourth digitally signed textual element further comprises:
at least a first reference to the at least a first physical asset transfer;
at least a first reference to the at least a second physical asset transfer; and
at least a third validity flag; and
post, to the immutable sequential data structure, the at least a fourth digitally signed textual element.

* * * * *